US008018792B2

(12) United States Patent
Kyun et al.

(10) Patent No.: US 8,018,792 B2
(45) Date of Patent: Sep. 13, 2011

(54) METHOD OF CONSTRUCTING ENVIRONMENTAL MAP USING SONAR SENSORS

(75) Inventors: Chung Wan Kyun, Pohang (KR); Lee Kyoung Min, Pohang (KR)

(73) Assignee: Pohang University of Science and Technology, Pohang, Gyungbuk (KR)

( * ) Notice: Subject to any disclaimer, the term of this patent is extended or adjusted under 35 U.S.C. 154(b) by 269 days.

(21) Appl. No.: 12/453,111

(22) Filed: Apr. 29, 2009

(65) Prior Publication Data
US 2010/0061185 A1    Mar. 11, 2010

(30) Foreign Application Priority Data

Sep. 11, 2008   (KR) ........................ 10-2008-0089603

(51) Int. Cl.
*G01S 15/00* (2006.01)
(52) U.S. Cl. .......................................................... 367/11
(58) Field of Classification Search .................. 367/88, 367/11, 7
See application file for complete search history.

(56) References Cited

U.S. PATENT DOCUMENTS

| | | | | |
|---|---|---|---|---|
| 4,924,448 | A * | 5/1990 | Gaer | 367/88 |
| 6,205,380 | B1 * | 3/2001 | Bauer et al. | 701/23 |
| 2010/0061185 | A1 * | 3/2010 | Kyun et al. | 367/88 |

OTHER PUBLICATIONS

Ribo et al., "A comparison of three uncertainty calculi for building sonar-based occupancy grids", Rototics and Autonomous Systems 35, 2001, pp. 201-209.
Burguera et al., "Probabilistic Sonar Filtering in Scan Matching Localization", Proceedings of the 2007 IEEE/RSJ International Conference on Intelligent Robots and Systems, Oct. 29-Nov. 2, 2007, San Diego, CA, USA.
Thrun, "Learning Occupancy Grid Maps with Forward Sensor Models", Autonomous Robots 15, 2003, pp. 111-127.

* cited by examiner

*Primary Examiner* — Daniel Pihulic
(74) *Attorney, Agent, or Firm* — Birch, Stewart, Kolasch & Birch, LLP

(57) ABSTRACT

Disclosed herein is a method of constructing an environmental map using sonar sensors. The method includes the steps of checking whether conflict cells have occurred using input sonar sensor data; if conflict cells have occurred, selecting incorrect data and eliminating the conflict cells using sound pressure comparison until the conflict cells do not occur any longer; and once the elimination has completed, preparing a grid map using a Maximum Approximated Likelihood (MAL) approach. Inconsistency in data occurs when multiple pieces of sensor data overlap each other, the conflict cells are cells that experience inconsistency over an entire arc region, and candidates for the incorrect sonar sensor data are obtained when the conflict cells occur.

10 Claims, 19 Drawing Sheets
(13 of 19 Drawing Sheet(s) Filed in Color)

METHOD OF CONSTRUCTING ENVIRONMENTAL MAP USING SONAR SENSORS

BACKGROUND OF THE INVENTION

1. Field of the Invention

The present invention relates generally to a method of constructing an environmental map using sonar sensors, and, more particularly, to a method of constructing an environmental map using sonar sensors which is capable of accurately representing an environment using the data of inexpensive sonar sensors which usually is very erroneous.

2. Description of the Related Art

A grid map, a discretized field that converts an environment into a spatial lattice (see S. Thrun et al., Probabilistic Robotics, MIT Press, 2002), is extremely easy to recognize and understand, and can be used for localization (see D. Fox, W. Burgard and S. Thrun, "Markov Localization for Mobile Robots in Dynamic Environments", Journal of Artificial Intelligence Research, Vol. 11, 1999, pp 391-427), path planning (see Howie Choset, Kevin M. Lynch, Seth Hutchinson, G. Kantor et al., Principle of Robot motion planning: Theory, Algorithms, and Implementations, MIT Press, 2005), collision avoidance (see R. Siegwart and I. R. Nourbakhsh, Introduction to Autonomous Mobile Robots, MIT Press, 2004), interaction between humans and robots (see W. Lee, H. Ryu, G. Yang, H. Kim, Y. Park, and S. Bang, "Design guidelines for map-based human-robot interfaces: A colocated workspace perspective", International Journal of Industrial Ergonomics, vol. 37(5), 2007, pp 589-604), and multi-sensor fusion (see O. Cohen, Y. Edan, and E. Schechtman, "Statistical Evaluation Method for Comparing Grid Map Based Sensor Fusion Algorithms", International Journal of Robotics Research, Vol. 25(2), 2006, pp 117-133). Various methods of range measurement have been used to build grid maps, including laser range finders (LRFs), cameras, and sonar sensors. Although LRFs are attractive in terms of accuracy, a laser beam penetrates glass objects (see D. Silver, D. Morales, L. Rekleitis, B. Lisien, and H. Choset, "Arc Carving: Obtaining Accurate, Low Latency Maps from Ultrasonic Range Sensors," In Proceedings of the IEEE International Conference on Robotics and Automation, Vol. 2, 2004, pp 1554-1561). Cameras are sensitive to the illumination level (see M. Hebert, "Active and Passive Range Sensing for Robotics," In Proceedings of the IEEE International Conference on Robotics and Automation, 2000, pp. 102-110). Sonar sensors are designed to measure the range to the closest obstacle in their beamwidth, and are not subject to problems of penetration or sensitivity to illumination. Furthermore, since sonar sensors are much less expensive than LRFs, they are attractive for practical indoor service robots such as a robotic vacuum cleaner.

Despite their advantages, sonar sensors suffer from two well known characteristic problems: incorrect measurements and angular uncertainty.

Incorrect Measurements: Sonar sensors frequently fail to detect the nearest obstacle because of undesirable reflections (see FIGS. 1A, 1B and 1C). A reflection causes an incorrect reading that can form ghost obstacles or omit real obstacles from the map. Experiments in general indoor environments have shown that about more than half of sonar measurements are spurious. This will be described in detail below.

Angular Uncertainty: Sonar sensors directly provide range information about the nearest obstacle, but not angular information (see H. Choset, K. Nagatani and N. Lazar, "The arc-transversal median algorithm: a geometric approach to increasing ultrasonic sensor azimuth accuracy", IEEE Transactions on Robotics and Automation, Vol. 19 (3), 2003, pp 513-521). The uncertainty can hide narrow openings (see L. Kleeman and R. Kuc, "Sonar Sensing", in Handbook of Robotics, edited by B. Siciliano and O. Khatib, Springer, 2008), and distort the map.

Under these problems, a new grid-mapping method called the Conflict Evaluated Maximum Approximated Likelihood (CEMAL) approach is proposed in the present invention. It starts with the maximum likelihood (ML) approach due to its effectiveness for managing angular uncertainty (see S. Thrun, "Learning Occupancy Grid Maps with Forward Sensor Models," Autonomous Robots, Vol. 15, 2003, pp 111-127). Despite of this advantage, however, the ML approach has two drawbacks: erroneous maps (The map contains ghost obstacles, or fails to show real obstacles due to the effects of incorrect measurements) and a heavy computational load (The computational complexity of the ML approach is $O(2^k n)$ where k is the number of cells and n is the number of sonar readings).

It have been found that conflict cells, which will be presented in detail below, are related to these side effects as follows:

Erroneous Map: As conflict cells are caused only by incorrect measurements, it is essential to remove them. To do this, the conflict evaluation with sound pressure (CEsp) method, which distinguishes the incorrect readings that cause conflict cells, is proposed. The incorrect readings are filtered using the CEsp method, and then the erroneous parts can be reduced.

Heavy Computational load: When there are no conflict cells, the ML approach can be converted to a simple logic process that has light $O(n)$ computational complexity by an approximation of the likelihood. This is the maximum approximated likelihood (MAL) approach.

The CEMAL approach thus consists of two layers: the filtering layer (CEsp method) and the fusion layer (MAL approach). When conflict cells occur, the CEsp method detects incorrect readings. Only the correct readings are fused into a grid map using the MAL approach. Our main contributions are as follows:

CEMAL inherits the angular uncertainty handling capability of the ML approach. Unlike the ML approach, however, CEMAL eliminates erroneous parts because the CEsp method filters them out. Therefore, the quality of a CEMAL grid map is excellent even using cheap sonar sensors. Based on two criteria given below, it is confirmed that the CEMAL grid map is about 92% accurate and that it can represent about 96% of an environment.

CEMAL has a light $O(n)$ computational load that is comparable to the previous binary or trinary estimation approaches (see M. Ribo and A. Pinz, "A comparison of three uncertainty calculi for building sonar-based occupancy grids", Robotics and Autonomous Systems, Vol. 35 (3-4), 2001, pp 201-209), and is very low compared to the $O(2^k n)$ load of the ML approach. In addition, it can work incrementally. Several experiments showed that CEMAL requires approximately 1 ms to process one measurement.

CEMAL does not require adjustment of parameters. Binary or trinary estimation approaches must regulate their own updating parameters carefully to establish an accurate map. CEMAL requires partial modification only when using a different kind of sonar sensor.

CEMAL works well even with only two sonar sensors. The possibility of using a low number of sonar sensors allows CEMAL to be used in commercial applications.

Related researches will be described below.

Grid mapping will now be described first.

Previous grid-mapping approaches can be classified into two categories: binary (or trinary) estimation and high-dimensional optimization.

Binary (or Trinary) Estimation

As finding a solution among the $2^k$ possible maps is an intractable problem, binary or trinary estimation approaches decompose the high-dimensional problem into a collection of binary or trinary state estimation problems based on the assumption that each cell is independent of the others (see S. Thrun et al., Probabilistic Robotics, MIT Press, 2002). The posterior approach (PT) (see H. P. Moravec, "Sensor fusion in certainty grids for mobile robots", AI Magazine, Vol. 9, 1988, pp. 61-74) calculates a posterior probability that measures the occupancy of the cell. Other approaches (see J. Borenstein and Y. Koren, "Histogramic in-motion mapping for mobile robot obstacle avoidance," IEEE Transactions on Robotics and Automation, Vol. 7(4), 1991, pp 535-539) use a centerline model of the sonar sensor, and rely on the number of empty or occupied observations to estimate the state of each cell. The Dempster-Shafer approach (DS) (see R. R. Murphy, "Dempster-Shafer theory for sensor fusion in autonomous mobile robots", IEEE Transactions on Robotics and Automation, Vol. 14 (2), 1998, pp 197-206) infers a mass function that indicates whether a cell is occupied, empty, or in an unknown state based on the Dempster-Shafer theory (see G. Shafer, "A Mathematical Theory of Evidence", Princeton University Press, 1976). The fuzzy approach (FZ) (see G. Oriolo, G. Ulivi and M. Vendittelli, "Fuzzy maps: A new tool for mobile robot perception and planning", Journal of Robotic Systems, Vol. 14 (3), 1997, pp 179-197), based on the theory of fuzzy sets (see L. A. Zadeh, "Outline of a new approach to the analysis of complex systems and decision process", IEEE Transactions on Systems, Man, and Cybernetics, Vol. SMC-3 (1), 1973, pp 28-44), quantifies the possibility that indicates a cell belongs to an obstacle, and then determines safe cells that are free from obstacles. As these approaches explicitly or implicitly assume independence, they reduce the enormous computational burden and the computational complexity to $O(n)$. Because a measurement requires a constant time, the complexity is linear with the total number of measurements. However, the resulting grid map is defective in terms of representing narrow openings because the angular uncertainty is not handled appropriately by the assumption of the independence. Furthermore, these approaches require a tuning process whereby the updating parameters are regulated to acquire an accurate map.

High-Dimensional Optimization

Unlike the above approaches, the ML approach (see S. Thrun, "Learning Occupancy Grid Maps with Forward Sensor Models," Autonomous Robots, Vol. 15, 2003, pp 111-127) uses a likelihood of sensor measurements without the assumption of the independence of other cells, and acquires a grid map that maximizes that likelihood. As the ML approach suffers from a heavy computational load, the expectation-maximization (EM) algorithm (see A. P. Dempster, N. M. Laird and D. B. Rubin, "Maximum Likelihood from Incomplete Data Via EM Algorithm," Journal of the Royal Statistical Society Series B—Methodological, Vol. 39 (1), 1977, pp 1-38) is used in the paper "S. Thrun, "Learning Occupancy Grid Maps with Forward Sensor Models", Autonomous Robots, Vol. 15, 2003, pp 111-127." This solution reduces the computational complexity to $O(nk)$ per iteration due to $O(n)$ for E-step and $O(nk)$ for M-step. The expectation of each measurement is calculated for the E-step while for the M-step, the state of each cell is reversed and the change in expectation of related measurements is examined. However, the number of iterations of the EM tends to depend linearly on the size of the search space $2^k$ for the worst case. In addition, the EM algorithm may fall into a local minimum and cannot process data incrementally.

Coping with sonar sensor characteristics will now be described next.

Aside from mapping, previous research on methods for coping with the characteristics of sonar sensors can be divided into two groups. The first considered handling of the angular uncertainty of sonar sensors, and the second considered the detection of incorrect measurements.

Handling Angular Uncertainty

Arc maps (see D. Baskent and B. Barshan, "Surface profile determination from multiple sonar data using morphological processing," International Journal of Robotics Research, Vol. 18 (8), 1999, pp 788-808) have been developed to deal with the angular uncertainty. The arc map shows an environment with only a collection of arcs, and obstacles can be located anywhere on the arcs. The arc transversal median (ATM) method (see H. Choset, K. Nagatani and N. Lazar, "The arc-transversal median algorithm: a geometric approach to increasing ultrasonic sensor azimuth accuracy", IEEE Transactions on Robotics and Automation, Vol. 19 (3), 2003, pp 513-521) gathers intersections of sonar arcs, and extracts the median points from them. The arc-carving (AC) method (see D. Silver, D. Morales, L. Rekleitis, B. Lisien, and H. Choset, "Arc Carving: Obtaining Accurate, Low Latency Maps from Ultrasonic Range Sensors", In Proceedings of the IEEE International Conference on Robotics and Automation, Vol. 2, 2004, pp 1554-1561) eliminates portions of sonar arcs that are contradicted by subsequent sonar readings, and derives the mean point of the remaining arc. The directional maximum (DM) method (see B. Barshan, "Directional Processing of Ultrasonic Arc Maps and its Comparison with Existing Techniques", International Journal of Robotics Research, Vol. 26(8), 2007, pp 797-820) uses a direction of interest, and a cell that has a maximum intersection count along that direction is selected.

Detecting Incorrect Measurements

Several techniques have been developed for filtering out incorrect measurements, and these can be divided into four classes:

The first class eliminates incorrect sonar measurements by clustering. The random sample consensus/Gaussian filtering (RANSAC/GF) method (see A. Burguera, Y. Gonzalez and G. Oliver, "Sonar Scan Matching by Filtering Scans using Grids of Normal Distributions", The International Conference on Intelligent Autonomous Systems, 2008, pp 64-73) establishes a Gaussian distribution with the RANSAC clustering (see M. A. Fischler and R. C. Bolles, "Random sample consensus: A paradigm for model fitting with application to image analysis and automated cartography", Communications of the ACM, Vol. 24 (6), 1981, pp 381-395); readings that do not fit the distribution are rejected as outliers.

The second class discriminates sonar measurements that form geometric primitives, such as lines and points. The region of constant depth (RCD) matching method (see R. Kuc, and M. W. Siegel, "Physically based simulation model for acoustic sensor robot navigation", IEEE Transactions on Pattern Analysis and Machine Intelligence, Vol. 9 (6), 1987, pp 766-778) uses a geometric constraint based on the radius of a circle. Only sonar readings that satisfy this constraint are considered correct. The RCD matching method is useful for finding corners, planes, and cylinders. The feature prediction (FP) method (see S. O'Sullivan, J. J. Collins, M. Mansfield, D. Haskett, M. Eaton, "Linear feature prediction for confidence estimation of sonar readings in map building", In Proceedings of the International Symposium on Artificial Life and Robotics (AROB), Japan, 2004) assigns a confidence measure to each sonar reading to indicate whether it is reliable. The position and orientation of features established by hypothetical obstacles in the local space of the robot determine the reliability.

The third class limits the maximum admissible range adaptively. The bounding box method (see E. Ivanjko, I. Petrovic and K. Macek, "Improvements of occupancy grid maps by sonar data corrections", In Proceedings of FIRA Robot Soccer World Congress, Vienna, Austria, 2003) was introduced to correct unreliable sonar sensor readings, creating a bounding box from four (front, back, left, and right)-directional sensor readings. If a sensor reading falls outside the box, its range is modified to be on the border of the box. In the navigable Voronoi diagram (NVD) method (see K. Lee and W. K. Chung, "Navigable voronoi diagram: a local path planner for mobile robots using sonar sensors", In Proceedings of IEEE/RSJ International Conference on Intelligent Robots and Systems, 2007, pp 2813-2818), the diagram is generated by instantaneous measurements, and sonar readings beyond the diagram are excluded.

The fourth class focuses on the consistency of sonar information. The sonar probabilistic analysis of conflicts (spAC) method (see A. Burguera, Y. Gonzalez and G. Oliver, "Probabilistic sonar filtering in scan matching localization", In Proceedings of IEEE/RSJ International Conference on Intelligent Robots and Systems, 2007, pp 4158-4163) iteratively determines the probability of each sonar reading based on the occurrence of conflict cells. The CEsp method is included in this class, and will be described below. The conflict evaluation method based on a logical approach was proposed (see K. Lee, I. H. Suh, S. Oh, and W. K. Chung, "Conflict Evaluation Method for Grid Maps using Sonar Sensors," In Proceedings of IEEE/RSJ International Conference on Intelligent Robots and Systems, 2008, pp 2908-2914) in precursor research into the CEsp method. However, because the previous approach has exceptional cases, it is difficult to apply generally.

SUMMARY OF THE INVENTION

Accordingly, the present invention has been made keeping in mind the above problems occurring in the prior art, and an object of the present invention is to provide a method of constructing an environmental map using sonar sensors which is capable of accurately representing an environment using the data of inexpensive sonar sensors that usually has much error.

In order to accomplish the above object, the present invention provides a method of constructing an environmental map using sonar sensors, including the steps of checking whether conflict cells have occurred using input sonar sensor data; if conflict cells have occurred, selecting incorrect data and eliminating the conflict cells using sound pressure comparison until the conflict cells do not occur any longer; and once the elimination has completed, preparing a grid map using a Maximum Approximated Likelihood (MAL) approach.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The above and other objects, features and advantages of the present invention will be more clearly understood from the following detailed description taken in conjunction with the accompanying drawings, in which:

FIG. 1A indicates that mirror-like reflection occurs when the emitted wave is obliquely reflected from a smooth surface (see L. Kleeman and R. Kuc, "Sonar Sensing", in Handbook of Robotics, edited by B. Siciliano and O. Khatib, Springer, 2008), FIG. 1B indicates that high-order reflection occurs when the wave returns after striking multiple obstacles (see P. J. McKerrow and S. min Zhu, "Modelling multiple reflection paths in ultrasonic sensing", In Proceedings of IEEE/RSJ International Conference on Intelligent Robots and Systems, 1996, pp 284-291), and FIG. 1C indicates that cross-talk occurs when the wave returns to a different sensor (see D. Bank and T. Kampke, "High-Resolution Ultrasonic Environment Imaging", IEEE Transactions on Robotics, Vol. 23 (2), 2007, pp 370-381);

FIG. 3A shows uncertain cells $U_c$, and FIG. 3B shows conflict cells $F_c$;

FIG. 8A shows S600, and FIG. 8B shows MA50B8;

FIG. 9A shows the case of five conflict cells, with, after comparison of the sound pressure, it being concluded that only one cell, indicated as the black box in FIG. 9B, can contain an obstacle and, thus, $j_1$ and $j_2$ are incorrect;

FIG. 14A shows a reference map in which the line indicates the trajectory of the robot and the dashed areas represent narrow openings, FIG. 14B shows a PT map ($A_{PT}$=0.9, $F_{PT}$=0.4), FIG. 14C shows a DS map ($A_{DS}$=0.9, $F_{DS}$=0.1), FIG. 14D shows an FZ map ($A_{FZ}$=0.6, $F_{FZ}$=0.1), FIG. 14E shows an ML map, which contains only occupied and empty cells because the ML approach originally sets the state of a cell to occupied or empty, and FIG. 14F shows a CEMAL map in which the dashed areas represent significant errors;

FIG. 15A shows a reference map in which the line indicates the trajectory of the robot, and the dashed areas indicate narrow openings, FIG. 15B shows a PT map ($A_{PT}$=0.9, $F_{PT}$=0.4), FIG. 15C shows a DS map ($A_{DS}$=0.9, $F_{DS}$=0.1), FIG. 15D shows an FZ map ($A_{FZ}$=0.9, $F_{FZ}$=0.1), FIG. 15E shows an ML map, and FIG. 15F shows a CEMAL map in which the dashed areas indicate significant errors;

FIG. 16A shows a reference map in which the line indicates the trajectory of the robot, FIG. 16B shows a PT map ($A_{PT}$=0.9, $F_{PT}$=0.4), FIG. 16C shows a DS map ($A_{DS}$=0.9, $F_{DS}$=0.1), FIG. 16D shows an FZ map ($A_{FZ}$=0.9, $F_{FZ}$=0.1), FIG. 16E shows an ML map, and FIG. 16F shows a CEMAL map;

FIG. 17A shows a reference map in which the line indicates the trajectory of the robot, FIG. 17B shows a PT map ($A_{PT}$=0.9, $F_{PT}$=0.4), FIG. 17C shows a DS map ($A_{DS}$=0.9, $F_{DS}$=0.1), FIG. 17D shows an FZ map ($A_{FZ}$=0.9, $F_{FZ}$=0.1), FIG. 17E shows an ML map, and FIG. 17F shows a CEMAL map in which the dashed areas represent significant errors;

FIG. 21A shows a reference map, where dashed areas represent narrow openings, FIG. 21B shows an arc map produced using the AC method, FIG. 21C shows an arc map produced using the ATM method, FIG. 21D shows an arc map produced using the DM method, and FIG. 21E shows a CEMAL map;

FIG. 22A shows a reference map, where dashed areas represent narrow openings, FIG. 22B shows an arc map produced using the AC method, FIG. 22C shows an arc map produced using the ATM method, FIG. 22D shows an arc map produced using the DM method, and FIG. 22E shows a CEMAL map; FIG. 23A shows a case with only two MA40B8 sensors, and FIG. 23B shows a case with only two S600 sensors.

DESCRIPTION OF THE PREFERRED EMBODIMENTS

Figure 1A:
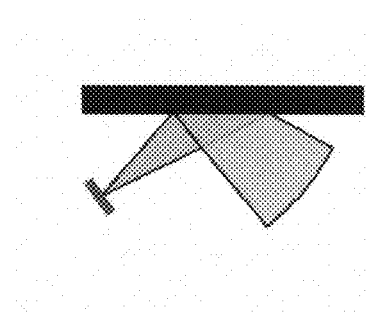
FIGS. 1A to 1C show examples of undesirable reflections.

Reference now should be made to the drawings, in which the same reference numerals are used throughout the different drawings to designate the same or similar components.

A conflict evaluation method will be described below.

The inconsistency of information in cells can be a clue that indicates candidates for incorrect measurements, and the sound pressure of the wave from the sonar sensor determines incorrect readings among them.

Conflict cells will now be described first.

Figure 2:
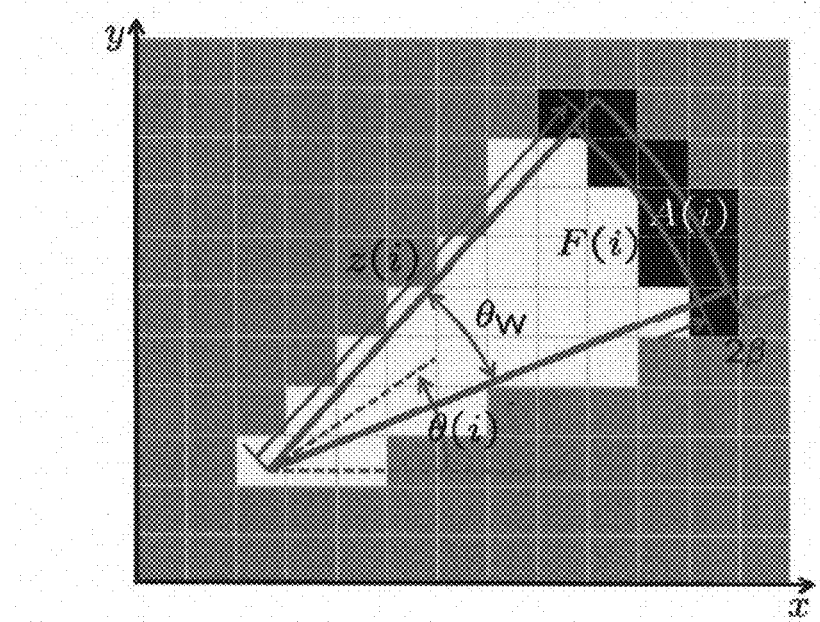
FIG. 2 shows the region of sonar reading i where $\theta(i)$ is the line-of-sight of the sensor, $\theta_w$ is the beam-width, $z(i)$ is the range, $F(i)$ is the free region (white cells), $A(i)$ is the arc region (black cells), and $2\beta$ is the interval corresponding to range uncertainty.

A sonar measurement is divided into two regions: the arc region and the free region. The arc region is the farthest area of measurement where the cells are marked as occupied because obstacles are probably located there. The cells in the free region, which is everything within the beamwidth of the sensor except the arc region, are generally marked as empty as the free region is free of obstacles. FIG. 2 shows each region on a gridded field.

When multiple sonar measurements overlap, inconsistency of information contained in cells may occur. Depending on inconsistency, a cell is classified into two groups: the consistent cells ($C_c$) and the inconsistent cells ($I_c$). Inconsistent cells in the arc region of reading i are defined as:

$$I_c(i) = \bigcup_{k=I(i)} (A(i) \cap F(k)) \tag{1}$$

where A(i) and F(k) are described in FIG. 2 and I(i) is the index of sonar readings that each free region shares with the arc region of reading i. I(i) is defined as:

$$I(i) = \{k | A(i) \cap F(k) \neq \emptyset \text{ for } 1 \leq k \leq n (k \neq i)\} \tag{2}$$

where n is the total number of sonar readings. Unlike inconsistent cells, consistent cells are cells that contain only one type of information.

Figure 3A:
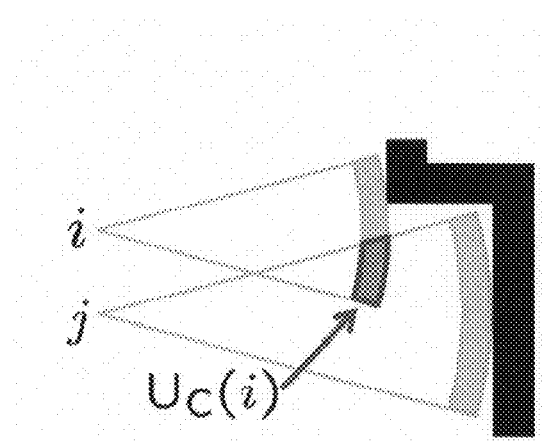
FIGS. 3A and 3B show different types of inconsistent cell.
Figure 3B:
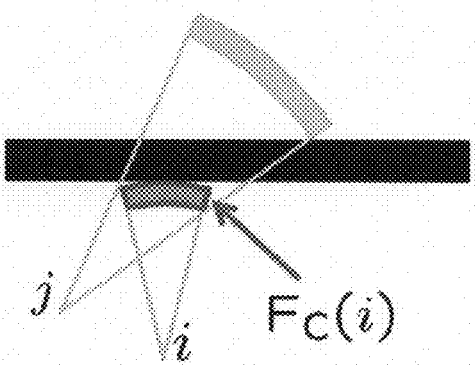

Inconsistent cells are classified into two groups: the uncertain cells (FIG. 3A) and the conflict cells (FIG. 3B). When some arc cells are inconsistent, these inconsistent cells are classified as uncertain cells $U_c$. In addition, when all of the arc cells are inconsistent, they are classified as conflict cells $F_c$. Each cell is defined as follows:

$$U_c(i) = \{I_c(i) \text{ for } A(i) \neq I_c(i)\} \tag{3}$$

$$F_c(i) = \{I_c(i) \text{ for } A(i) = I_c(i)\}. \tag{4}$$

Figure 4:
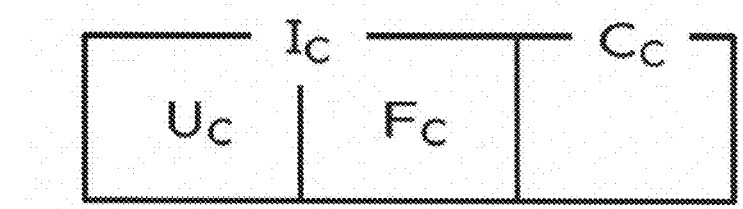
FIG. 4 indicates that a cell is in one of the illustrated groups.

Eventually, above classification can be summarized as FIG. 4.

It can be easily guessed that consistent and uncertain cells are caused by both correct and incorrect readings. For example, in FIG. 3A, both i and j are correct, and the uncertain cells $U_c(i)$ exists. Thus, candidates for incorrect readings cannot be obtained from consistent and uncertain cells. Unlike them, since conflict cells are always caused by incorrect sonar readings as indicated by the following theorem, the candidates can be acquired.

Theorem 1: Conflict cells are caused only by incorrect readings.

Figure 5A:
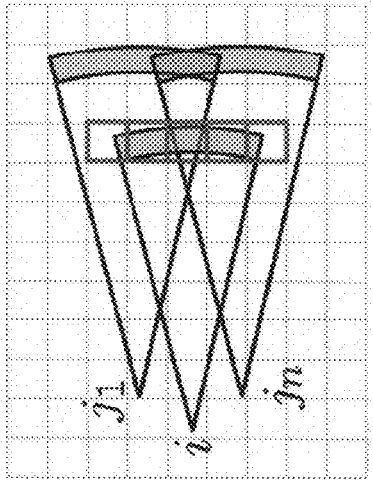
FIG. 5A shows conflict cells, FIG. 5B indicates that if it is assumed that an obstacle is located in the conflict cells, some sonar readings among $j_1 \ldots j_n$ in will be incorrect, and FIG. 5C indicates that sonar reading i will be incorrect if it is assumed that there are no obstacles in the conflict cell area.
Figure 5B:
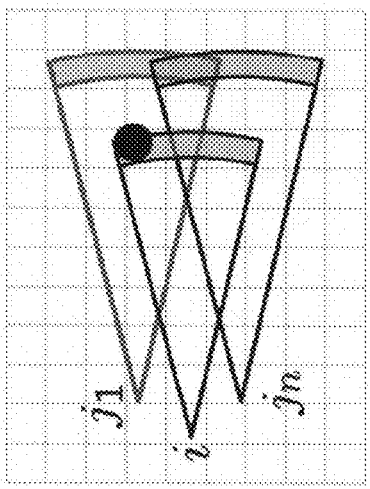
Figure 5C:
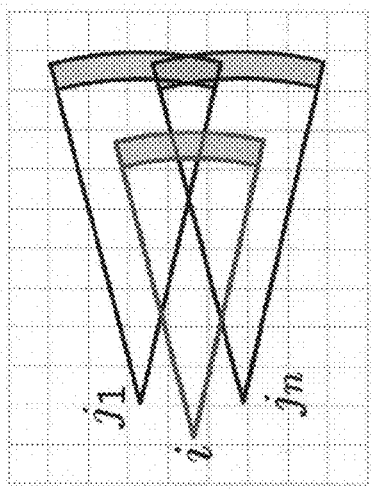

Proof: Let us assume that conflict cells occur as shown in FIG. 5A. Without any loss of generality, it is assumed that conflict cells of sonar reading i occur along with several other readings $j_1 \ldots j_n$. That is, #[I(i)]≧1. If it is assumed that an obstacle is in the region where conflict cells occur, then some sonar readings among $j_1 \ldots j_n$ in will be incorrect. Sonar reading $j_1$ in FIG. 5B is incorrect as the obstacle is in the free region of $j_1$. In addition, if it is assumed that there are no obstacles in the region where conflict cells occur, then the sonar reading i will be incorrect as there is nothing in the arc region of i as shown in FIG. 5C. Therefore, conflict cells are always caused only by incorrect readings.

Theorem 1 indicates that incorrect readings are the only source of conflict cells. Therefore, when conflict cells occur, candidates for incorrect measurements can be obtained. In the case of FIG. 5A, sonar readings $i, j_1$ and $j_n$ become the candidates.

A conflict evaluation method will now be described next.

To determine incorrect readings among above candidates, the sound pressure of the wave from the sonar sensor is used.

Sound Pressure

The sound pressure of the transmitted wave is expressed as $SP_T(r,\theta)$ where r is the distance from the sensor to the obstacle and $\theta$ is the angle from the heading of the sensor. When $\theta=0$, $SP_T(r,0)$ can be approximated as $$SP_T(r, 0) = 2\rho c U \left| \sin\left\{\frac{1}{2}kr\left[\sqrt{1+(a/r)^2} - 1\right]\right\} \right| \quad (5)$$

$$\simeq \frac{1}{2}\frac{\rho c U a^2 k}{r} \quad (6)$$

$$= \frac{c_1}{r} \quad (7)$$

where $\rho$ is the density of the air, c is the sound speed in air, U is the speed of vibration of the circular piston inside the sonar sensor, k is the wave number, and a is the radius of the circular piston. Because a sonar sensor is often modeled as a plane circular piston (see L. Kleeman and R. Kuc, "Sonar Sensing," in Handbook of Robotics, edited by B. Siciliano and O. Khatib, Springer, 2008), the sound pressure is expressed by Equation (5) with more details provided in the paper "L. E. Kinsler, A. R. Frey, A. B. Coppens, and J. V. Sanders, "Fundamentals of Acoustics", New York: Wiley, 2000." The far-field approximation (r/a>>1) (see L. E. Kinsler, A. R. Frey, A. B. Coppens, and J. V. Sanders, "Fundamentals of Acoustics", New York: Wiley, 2000) produces Equation (6), and merging constant terms reduces this to Equation (7). Equation (7) indicates that the sound pressure of the transmitted wave along the axis of its direction is approximately inversely proportional to r.

The transmitting directivity ($D_T$) or the directivity pattern (see L. Kleeman and R. Kuc, "Sonar Sensing", in Handbook of Robotics, edited by B. Siciliano and O. Khatib, Springer, 2008) is required when considering the sound pressure of the transmitted wave off the axis of its direction. This is defined as:

$$D_T(\theta) = 20 \log\left(\frac{SP_T(r, \theta)}{SP_T(r, 0)}\right). \quad (8)$$

From Equations (7) and (8), the sound pressure of the wave off the axis $\theta$ can be expressed as:

$$SP_T(r, \theta) = SP_T(r, 0) \, 10^{\frac{D_T(\theta)}{20}}. \quad (9)$$

The wave returns to the sensor after impinging on an obstacle located at $(r,\theta)$. As the wave travels a distance of 2r, the sound pressure $SP_R'(r,\theta)$ just before the sonar sensor receives the wave can be expressed as:

$$SP_R'(r, \theta) = SP_T(2r, 0) \, 10^{\frac{D_T(\theta)}{20}}. \quad (10)$$

In a general indoor environment, a decrease due to the impingement against the obstacle frequently occurs. As the decrease is proportional to the reflection coefficient, which is constant for an obstacle of a specific material (see L. E. Kinsler, A. R. Frey, A. B. Coppens, and J. V. Sanders, "Fundamentals of Acoustics", New York: Wiley, 2000), it is set as an unknown constant $c_2$. Thus, Equation (10) becomes:

$$SP_R'(r, \theta) = c_2 SP_T(2r, 0) \, 10^{\frac{D_T(\theta)}{20}}. \quad (11)$$

As the returning wave is off the axis $\theta$, the sound pressure finally detected at the sensor is decreased as a function of the receiving directivity ($D_R$) or the sensitivity pattern (see L. Kleeman and R. Kuc, "Sonar Sensing", in Handbook of Robotics, edited by B. Siciliano and O. Khatib, Springer, 2008), and the final detected sound pressure $SP_R(r,\theta)$ can be expressed as:

$$SP_R(r, \theta) = c_2 SP_T(2r, 0) \, 10^{\frac{D_T(\theta)}{20}} \, 10^{\frac{D_R(\theta)}{20}} \quad (12)$$

$$= \frac{c_3}{r} 10^{\frac{D_T(\theta) + D_R(\theta)}{20}}. \quad (13)$$

Although $c_3$ is an unknown constant in Equation (13), it is not necessary to consider it because it is canceled when sound pressure levels are compared with each other. The two terms $D_T(\theta)$ and $D_R(\theta)$ are required to derive the final detected sound pressure. For the purposes of this study, the directivity of the 600 series sensor (S600) from SensComp Inc was investigated. and the MA40B8 sensors from Murata Co., Ltd. was investigated. The MA40B8 is a piezoelectric transducer with a wider beamwidth and a lower cost than the S600 electrostatic transducer. Detailed properties of piezoelectric and electrostatic transducers are provided by the paper "L. Kleeman and R. Kuc, "Sonar Sensing," in Handbook of Robotics, edited by B. Siciliano and O. Khatib, Springer, 2008."

Figure 6A:
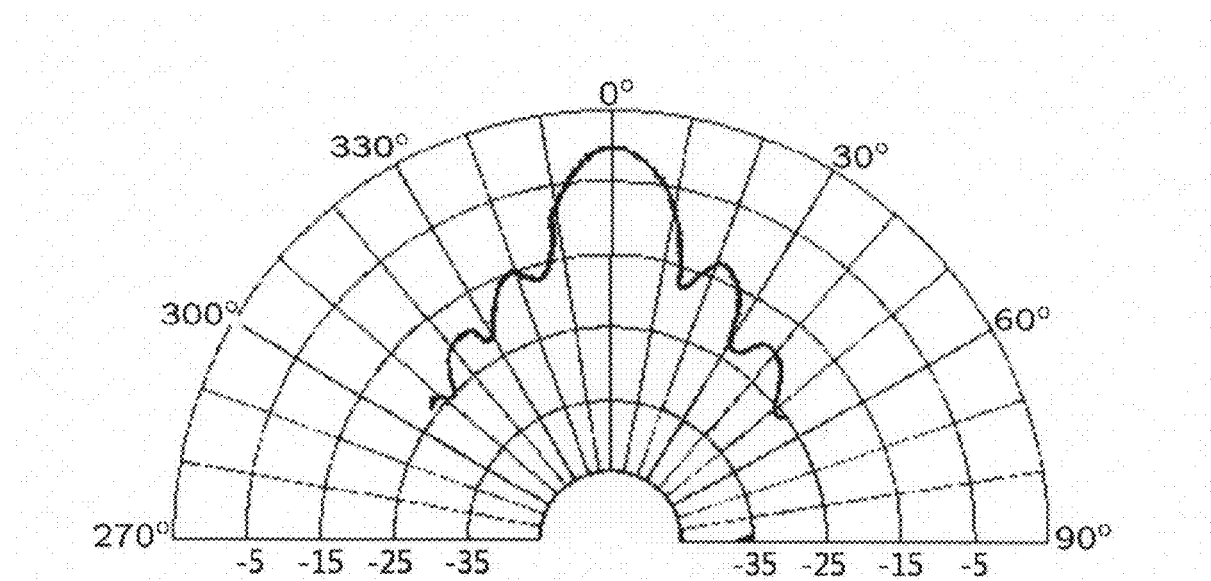
FIGS. 6A and 6B show S600 directivity and approximate directivity in the region of interest, respectively, with the black squares being obtained from sampling in FIG. 6A, and with the red line representing an approximated 2nd-order polynomial.
Figure 6B:
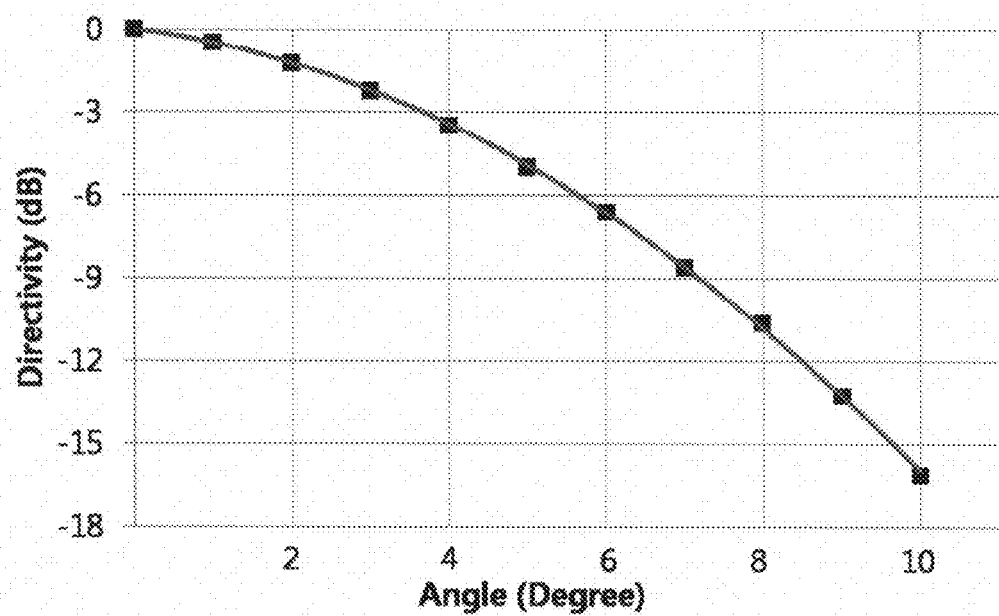

S600: As the S600 consists of just one module, $D_T$ and $D_R$ are the same. The directivity shown in FIG. 6A is from the manufacturer's data sheet. As interest lies only in a beamwidth of 22.5°, the directivity in the region of interest can be approximated by a 2nd-order polynomial as shown in FIG. 6B, using the following equation:

$$D_T(\theta) = D_R(\theta) \approx -0.0605\theta^2 - 0.1977|\theta| \text{ for } |\theta| \leq 11.250°. \quad (14)$$

Figure 8A:
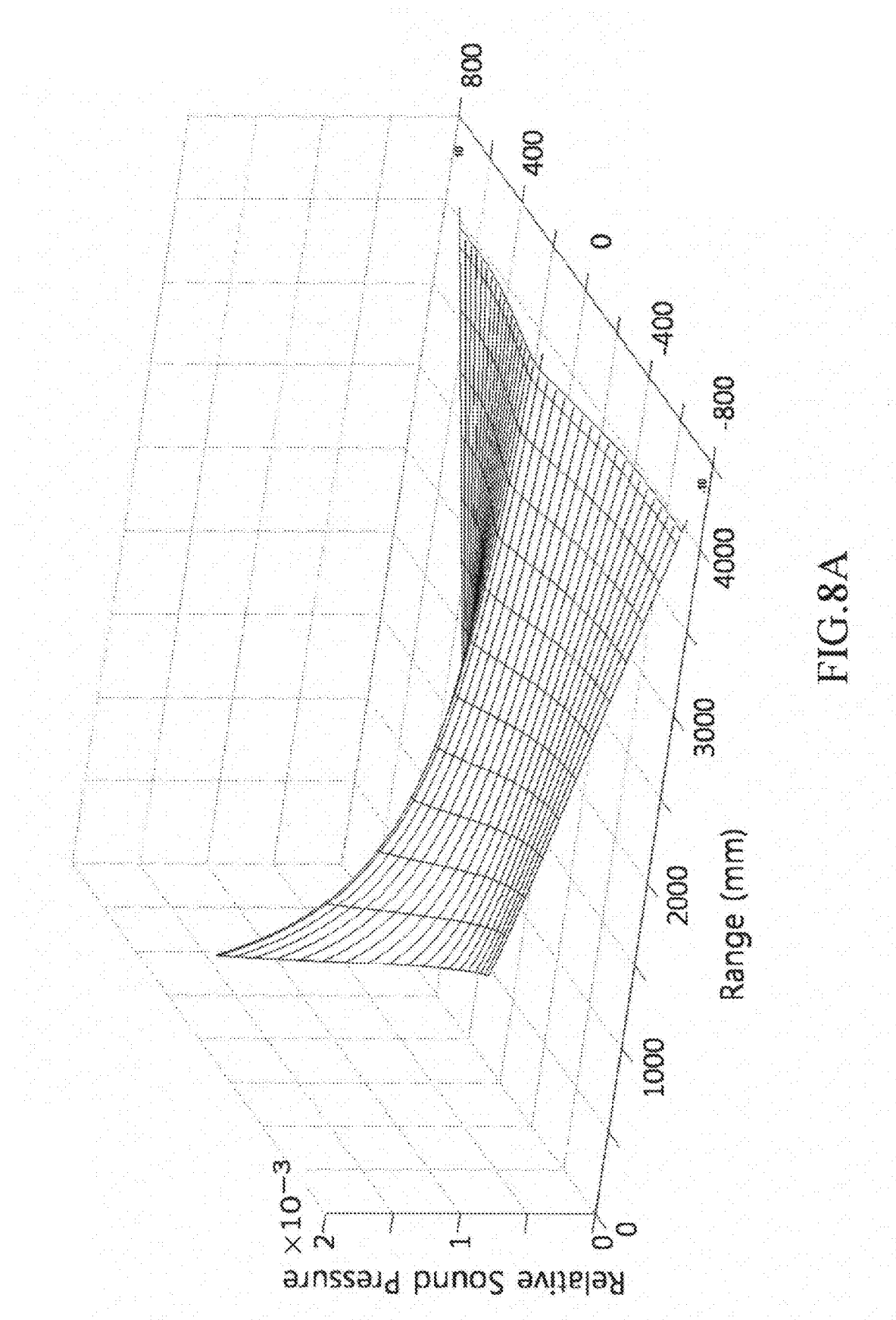
FIGS. 8A and 8B show transducer sound pressures, which are not absolute values as the unknown constants are set to 1, with, however, this being not important as the constant will be canceled when comparing sound pressure levels.

Eventually, when an obstacle is located in a cell $(r,\theta)$ relative to the sensor, the sound pressure recognized by the S600 is shown in FIG. 8A, and its equation is:

$$SP_R(r, \theta) = \frac{c_3}{r} 10^{(-0.00605\theta^2 - 0.01977|\theta|)}. \quad (15)$$

Figure 7A:
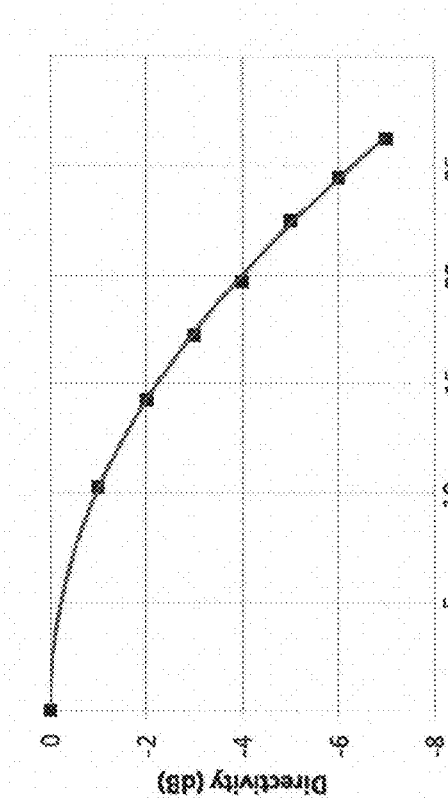
FIGS. 7A to 7D show MA40B8 transmitter directivity, approximate transmitter directivity in the region of interest, MA50B8 receiver directivity, and approximate receiver directivity in the region of interest, respectively, with, in FIGS. 7B and 7D, black squares being obtained from sampling the curves in FIGS. 7A and 7C, and with the red lines in FIGS. 7B and 7D indicating the approximated 2nd-order polynomials.
Figure 7B:
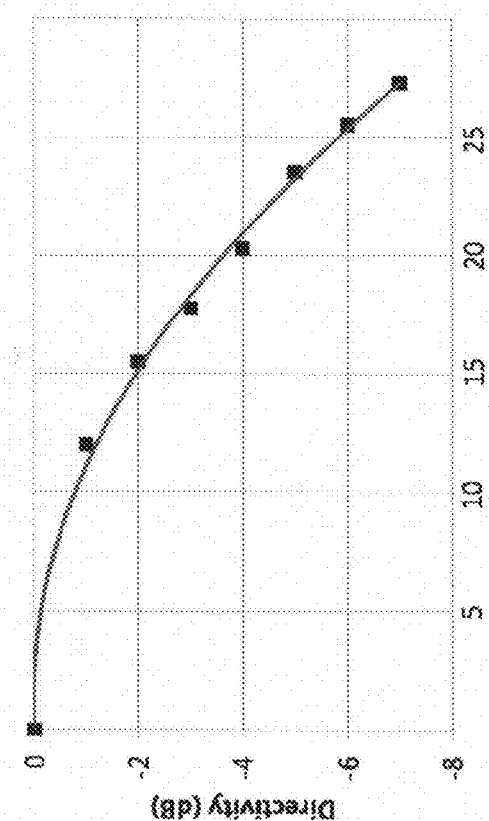
Figure 7C:
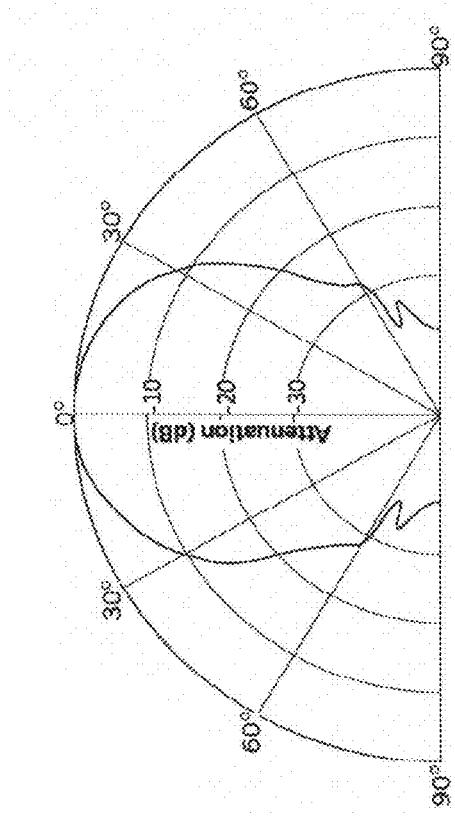
Figure 7D:
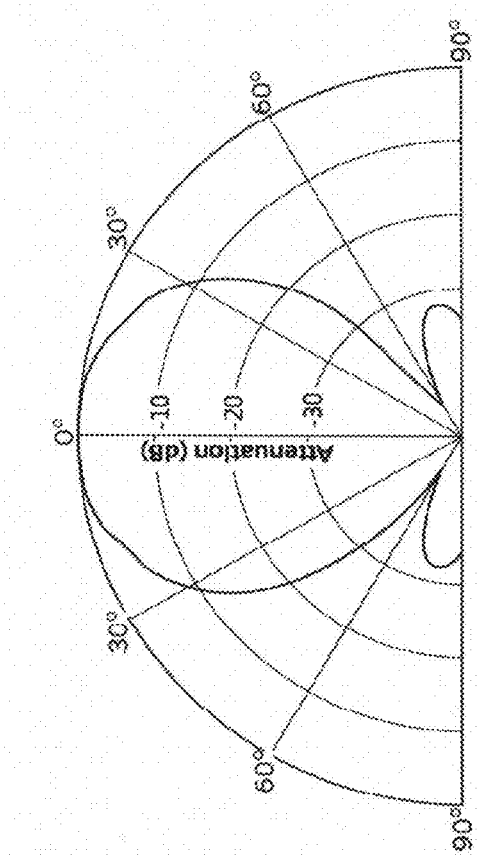

MA40B8: MA40B8 has both a transmitter and a receiver with directivities shown in FIGS. 7A and 7C, respectively. As the half power beamwidth is about 45°, the directivity in the region of interest can be approximated by 2nd-order polynomials as shown in FIGS. 7B and 7D using these equations:

$$\left.\begin{array}{l}D_T(\theta) \approx -0.0103\theta^2 + 0.0053|\theta| \\ D_R(\theta) \approx -0.0102\theta^2 + 0.0241|\theta|\end{array}\right\} \quad (16)$$

for $$|\theta| \le 22.5°.$$

Figure 8B:
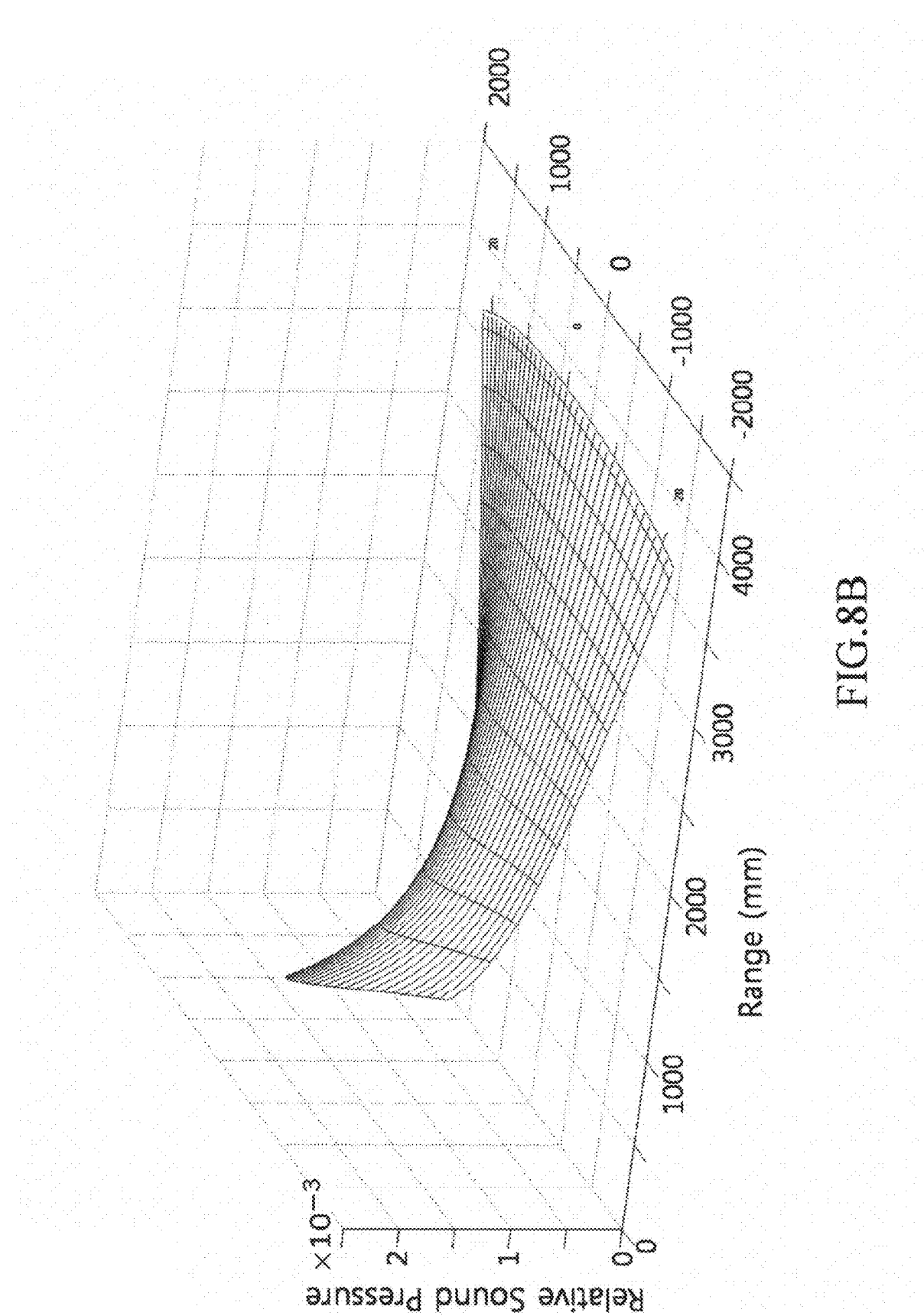

Based on these equations, the sound pressure recognized by the sonar sensor is shown in FIG. 8B and its equation is:

$$SP_R(r, \theta) = \frac{c_3}{r} 10^{(-0.001025\theta^2 + 0.00147|\theta|)}. \quad (17)$$

In the derivation of Equations (15) and (17), it is assumed that the excitation frequency f of the sonar sensor is fixed at the value given in the respective manufacturer's data sheet (e.g., 50 kHz for the S600 and 40 kHz for the MA40B8). Different frequencies change the directivity and alter the final detected sound pressure. Therefore, if the sonar sensor is excited at a different frequency, the sound pressure must be recalculated for the appropriate directivity.

Conflict Evaluation Method Using the Sound Pressure

Figure 9A:
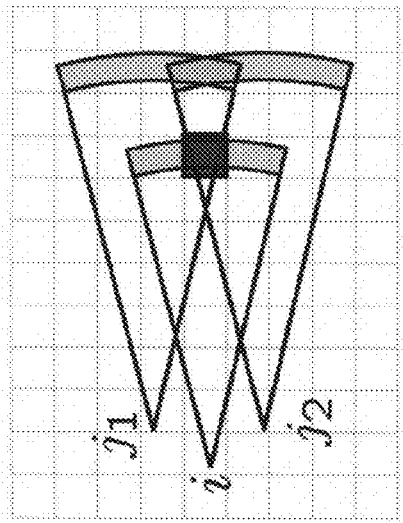
FIGS. 9A and 9B show conflict cells.

It is supposed that conflict cells occur as shown in FIG. 9A. In this case, sonar reading i indicates that there may be obstacles in conflict cells, while sonar readings $j_1$ and $j_2$ indicate that there are no obstacles. For simplicity, the former reading (i) is referred to as a positive reading, and the latter ($j_1, j_2$) is referred to as a negative reading. In addition, if an obstacle exists in a conflict cell, the sound pressure obtained from a positive reading is denoted as $SP_P$ and the pressure from a negative reading is $SP_N$. A comparison of $SP_P$ and $SP_N$ leads to the following conclusions.

$SP_P \ge SP_N$: If there is a real obstacle within the conflict cell, the negative reading can miss it as $SP_P \ge SP_N$. Hence, under the conservative perspective, it is reasonable to conclude that an obstacle is present.

$SP_P < SP_N$: If there is a real obstacle within the conflict cell, a negative reading cannot miss it as $SP_P < SP_N$. Thus, it is reasonable to conclude that no obstacle exists.

Figure 9B:
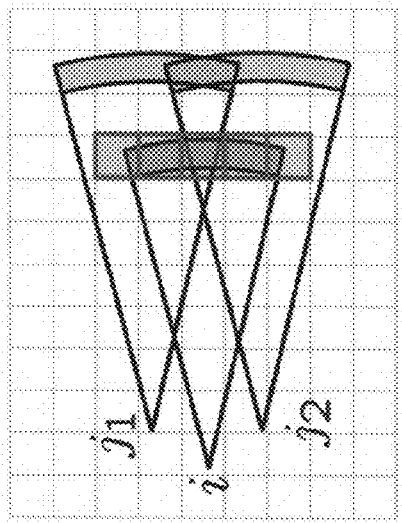

In the comparison, the constant $c_3$ in Equations (15) and (17) is canceled because there is $c_3$ on both sides of the inequality. In the case of FIG. 9A, five conflict cells occur as shown in red cells. Assuming the use of MA40B8 transducers, the above comparison reveals that only the black squared cell of FIG. 9B can contain an obstacle. Thus, the sonar readings $j_1$ and $j_2$ are incorrect because they have obstacles in their own free regions.

This sound pressure comparison is used to determine whether obstacles exist in conflict cells. This eventually leads to a determination of whether sonar readings are correct. This is the CEsp method, and is used to filter out incorrect readings to ensure there are no longer any conflict cells. After the conflict cells are removed, only consistent or uncertain cells remain. Using this, the ML approach can be converted to a simple logic problem.

A maximum approximated likelihood (MAL) approach will be described below.

When there are no conflict cells, the ML approach can be simplified to a light logic problem of O(n).

A Maximum Likelihood (ML) approach will now be described first.

As sonar sensors were originally designed to provide the distance to the closest obstacle in their beamwidth, their likelihood can be defined as:

$$p(z_i | M) = \eta \exp\left\{-\frac{1}{2}\left(\frac{z_i - d(N_i)}{\sigma}\right)^2\right\}. \quad (18)$$

In Equation (18), $z_i$ denotes the measurement of the sensor, M is the map, $\eta$ is a normalizing term, and $\sigma$ is the range uncertainty. The $d(N_i)$ is the distance to the nearest obstacle $N_i$ in the beamwidth, and is defined as:

$$d(N_i) = \begin{bmatrix} \text{distance to } N_i & \text{for } N_i \ne \phi \\ z_{max} & \text{for } N_i = \phi \end{bmatrix}. \quad (19)$$

Although more complicated likelihood was introduced in the paper "S. Thrun, "Learning Occupancy Grid Maps with Forward Sensor Models", Autonomous Robots, Vol. 15, 2003, pp 111-127," only Equation (18) is sufficient for building a reliable grid map as it can handle the angular uncertainty of the sonar sensor as shown in experimental results.

Based on Equation (18), the ML grid map is acquired through the following Equation:

$$\operatorname{argmax}_M p(Z | M) = \operatorname{argmax}_M \prod_i p(z_i | M) \quad (20)$$

$$= \operatorname{argmax}_M \sum_i \log p(z_i | M) \quad (21)$$

$$= \operatorname{argmin}_M \sum_i (z_i - d(N_i))^2 \quad (22)$$

where $Z = \{z_1, \ldots z_n\}$. In the right hand side of Equation (20), a static world assumption is used, indicating that other sensor measurements are conditionally independent when map M is given as in the papers "S. Thrun et al., Probabilistic Robotics, MIT Press, 2002" and "S. Thrun, "Learning Occupancy Grid Maps with Forward Sensor Models", Autonomous Robots, Vol. 15, 2003, pp 111-127." The log function is introduced for computational reasons in Equation (21), and the application of simple algebra results in Equation (22). The ML approach is to find the solution that minimizes the sum of quadratic functions. However, it suffers from two critical problems: erroneous map and heavy computational load.

Erroneous Map

TABLE 1

Percentages of Incorrect Readings

| Type of Sonar Sensor | Env. | # of Readings | Correct (%) | Incorrect (%) |
|---|---|---|---|---|
| MA40B8 | C#1 | 75.720 | 45 | 55 |
| | C#2 | 20.808 | 46 | 54 |
| | H#1 | 33.864 | 50 | 50 |
| | H#2 | 17.100 | 54 | 46 |
| | H#3 | 17.856 | 58 | 42 |
| | H#4 | 33.360 | 58 | 42 |
| | H#5 | 26.196 | 50 | 50 |
| | Total | 224.904 | 50 | 50 |

TABLE 1-continued

Percentages of Incorrect Readings

| Type of Sonar Sensor | Env. | # of Readings | Correct (%) | Incorrect (%) |
|---|---|---|---|---|
| S600 | C#1 | 97.504 | 38 | 62 |
| | C#2 | 29.296 | 38 | 62 |
| | H#1 | 51.504 | 38 | 62 |
| | Total | 178.304 | 38 | 62 |

Direct use of sonar measurements does not guarantee good quality ML grid maps because the ML approach suffers from the intrinsic over-fitting problem (see C. M. Bishop, Pattern Recognition and Machine Learning, Springer, 2007). As approximately 55% of sonar measurements are incorrect (Table. 1), the ML grid map will be over-fitted to those measurements and contain many errors. The problem, however, can be alleviated using the CEsp method that rejects incorrect measurements.

Heavy Computation

Finding the solution to Equation (22) is a huge-dimensional numerical optimization problem. As a map has $2^k$ dimensions, the solution requires $O(2^k n)$ computational complexity. The complexity, however, can be reduced to $O(n)$ by approximation after removing conflict cells as shown below.

A Maximum Approximated Likelihood (MAL) approach will now be described next.

Henceforth, it is assumed that only consistent and uncertain cells exist because conflict cells are removed by the CEsp method. Based on this assumption, the high-dimensional optimization problem is converted into one of simple logic. This requires an approximation of the likelihood.

Although the quadratic function in Equation (22) is exactly minimum when $z_i = d(N_i)$, the minimization is approximated by relaxing the margin $\pm \beta$ for the range uncertainty $\beta$ shown in FIG. 2. That is, the single quadratic function of Equation (22) is considered to be minimized when $|z_i - d(N_i)| \leq \beta$, and then Equation (22) can be converted to the following Equation:

$$\operatorname{argmin}_M \sum_i (z_i - d(N_i))^2 \approx \operatorname{argmin}_M \sum_i f(i) \quad (23)$$

where f(i) is defined as:

$$f(i) = \begin{bmatrix} 0 & \text{for } |z_i - d(N_i)| \leq \beta \\ (z_i - d(N_i))^2 & \text{for } |z_i - d(N_i)| > \beta \end{bmatrix}. \quad (24)$$

Thus, whenever $N_t$ is located in the arc region of a reading, the likelihood of the reading is approximately the maximum.

The global solution to Equation (22) is to minimize all f(i), which can be achieved when the closest obstacle of each sonar measurement is located in the arc region for that measurement. While the global solution is difficult to achieve or requires high-dimensional optimization for general cases, the following theorem shows that the global solution is easily obtainable when there are no conflict cells.

Theorem 2: When conflict cells do not exist, each sonar reading can have its own closest obstacle inside its own arc region.

Proof: As it is assumed that conflict cells have been removed, it is only necessary to examine two cases: that in which only consistent cells exist (case 1) and that in which both uncertain and consistent cells exist (case 2). It is impossible for uncertain cells to exist alone.

Figure 10A:
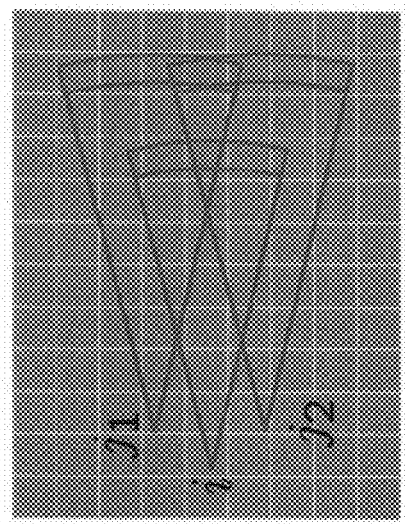
FIG. 10A shows MAL results for the case of consistent cells.

Case 1: When a sonar reading has only consistent cells as in FIG. 10A, it is trivial to determine that the closest obstacle can be located in the arc region of the reading.

Figure 10B:
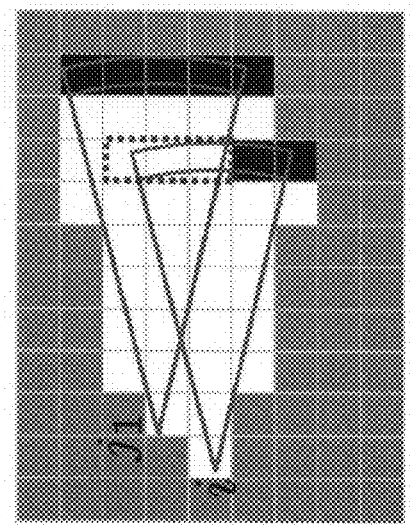
FIG. 10B shows MAL results for the case of consistent and uncertain cells (the uncertain cells are indicated as the blue-dotted box)

Case 2: When a sonar reading has both consistent and uncertain cells as in FIG. 10B, obstacles can be located in the arc region. In FIG. 10B, sonar reading i has uncertain cells in its arc region, but not all cells in the arc region are uncertain. Therefore, without affecting other sonar readings, the sonar reading can have the closest obstacle in its arc region. In addition, sonar reading $j_1$ has uncertain cells in its free region. As the uncertain cells are not related to the arc region of sonar reading $j_1$, it can also have the closest obstacle in its arc region.

Figure 11:
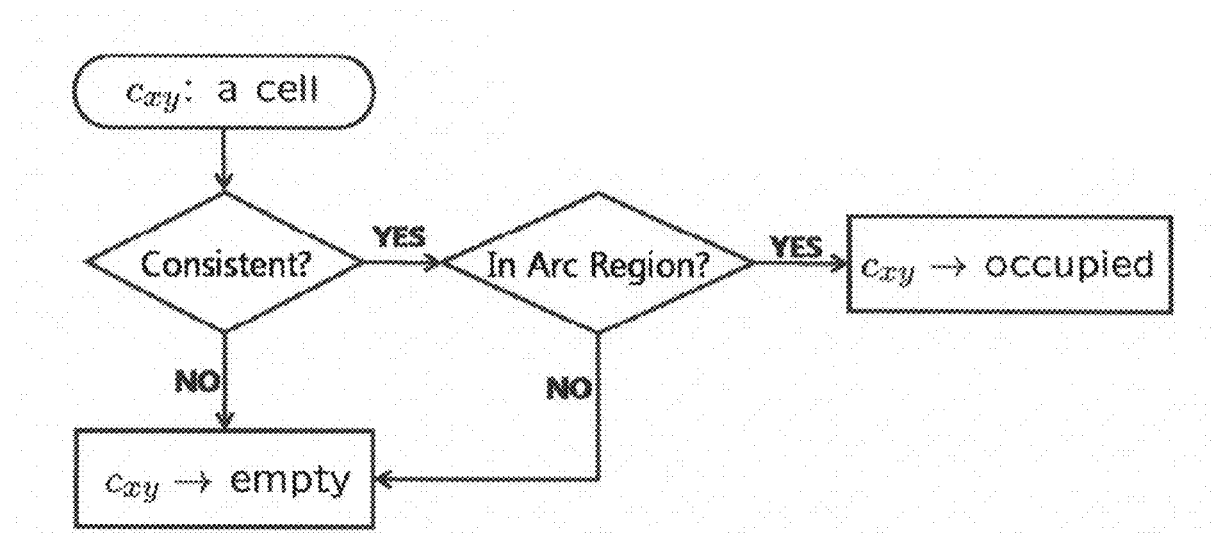
FIG. 11 shows a summary of the MAL approach, with the manner in which consistent cells are set to be the same with the same information and uncertain cells are set to be empty, minimizing Equation (23) globally.

Theorem 2 indicates that the global solution of Equation (23) is achievable when there are no conflict cells, and the solution can be obtained by the simple logical process summarized in FIG. 11. When a cell is consistent, its state is set according to the information it contains. Specifically, if the cell is in an arc region, it is set to the occupied state that corresponds to an obstacle. Conversely, if the cell is in a free region, it is set to the empty state. When a cell is uncertain, the cell is considered empty. If the uncertain cells are set to the occupied state, the quadratic functions of the other sensors would increase and not be minimized. For example, setting the uncertain cells of the sonar reading i in FIG. 10B to the occupied state increases the quadratic function of the sonar reading $j_1$, and the global solution is not possible. This simple process is called the MAL approach, and it has a computational complexity of $O(n)$ because it is just linear with the number of all measurements.

Figure 10C:
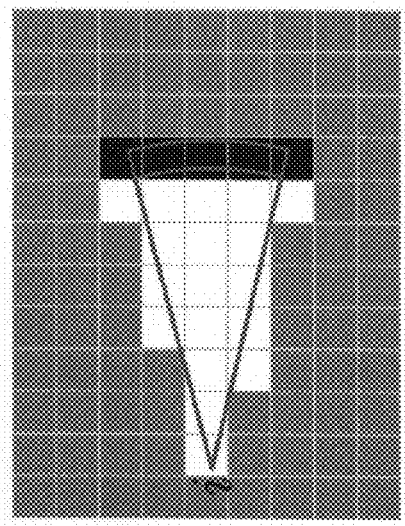
FIG. 10C shows conflict cells.

If conflict cells exist as in FIG. 10C, the solution that minimizes the quadratic function of the sonar reading i always increases the function of $j_1$ or $j_2$. As all of the conflict cells are removed by the CEsp method, however, it is not necessary to consider this case.

Method overview will be described below.

Figure 12:
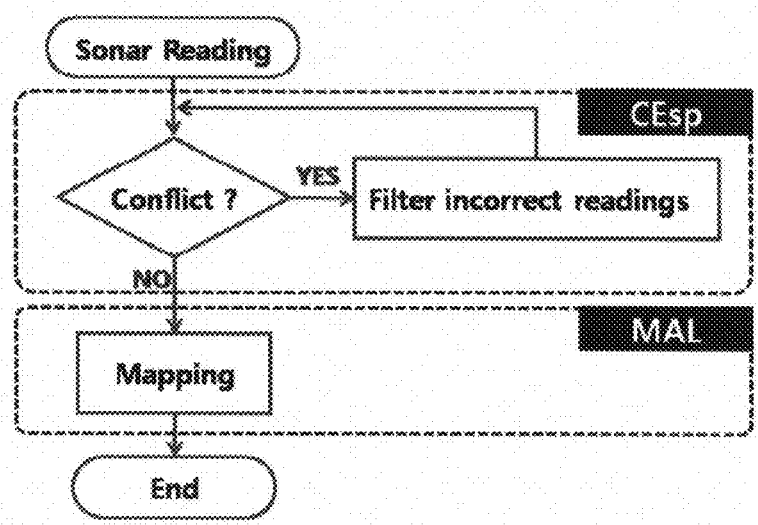
FIG. 12 is a flowchart showing the CEMAL approach.

The CEsp method and the MAL approach are proposed based on the conflict cell. Integrating the MAL approach with the CEsp method results in the CEMAL approach outlined in FIG. 12. As the CEsp method and the MAL approach can work incrementally, the procedure shown in FIG. 12 is executed once each time a sonar reading occurs. After receiving the sonar reading, the process checks whether conflict cells occur; if so, the CEsp method is executed until no conflict cells remain, and then the MAL process is executed.

In the worst case, the complexity of the CEMAL approach is $O(n^2)$: $O(n^2)$ for the CEsp method and $O(n)$ for the MAL approach. That is, the CEsp method dominates the complexity. In one cycle, the CEsp method checks whether the incoming reading causes conflict cells. This check may require that all other readings be checked. This is the worst case, and eventually the complexity becomes $O(n^2)$. In practice, however, the complexity of the CEsp method is not $O(n^2)$ because once readings are filtered, they are no longer considered. Moreover, the worst case only occurs when all sonar readings are accumulated within small areas (e.g., a robot stops in one position for a long time). As the worst case can be avoided with a simple algorithm to prevent the robot from gathering measurements when it stops, the complexity of the CEsp method can be regarded as $O(n)$.

Experimental results will be described below.

Experimental setup will now be described first.

Figure 13:
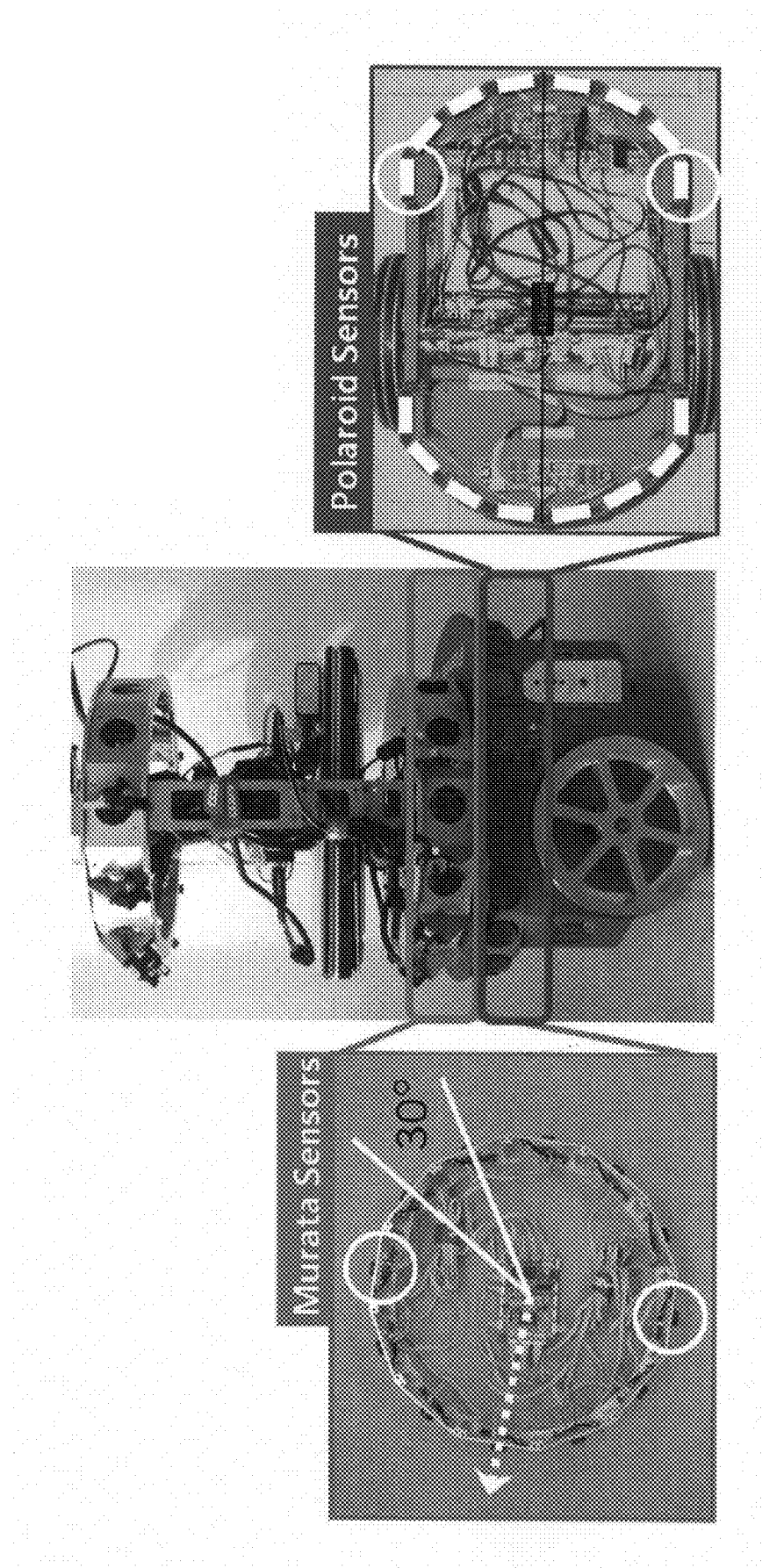
FIG. 13 shows the configuration of the sonar sensors used in the experiments: the left-hand image shows 12 MA40B8s, with a white dotted arrow indicating the direction of robot travel, in the right-hand figure, each white box represents the position of 16 S600 sensors, and the white circles represent the sonar sensors used in the experiments described later.
Figure 14A:
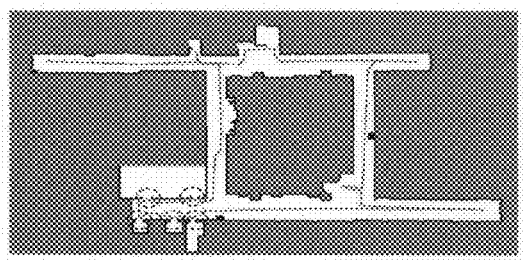
FIGS. 14A to 14F show experimental results in environment C#1 (62 m×30 m) with MA40B8 sensors.
Figure 14B:
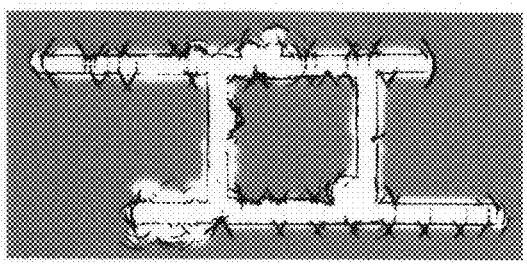
Figure 14C:
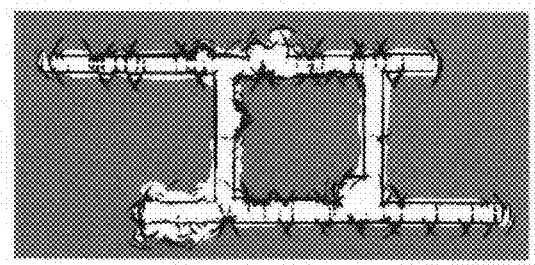
Figure 14D:
Figure 14E:
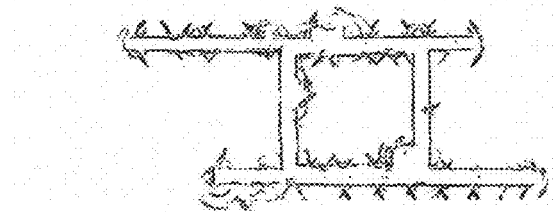
Figure 14F:
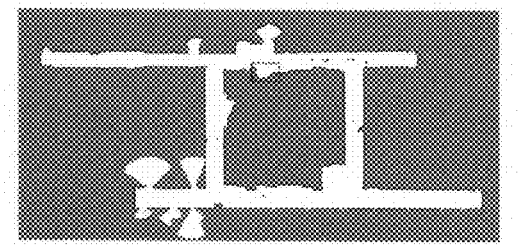

Experiments were conducted in various indoor environments using both the S600 and MA40B8 sonar sensors to verify the performance of the CEMAL approach. The configurations of the sonar sensors are shown in FIG. 13. Seven experimental environments, designated as C#1, C#2, and H#1-5, were used. Environments C#1 and C#2 were corridors, and environments H#1-5 were home-like environments containing general household items, such as tables, chairs, couches, and electronic appliances. The MA40B8 experiments were conducted in all environments, while the S600 was used only in C#1, C#2, and H#1.

The cell size used was 5 cm×5 cm, and a set of sonar measurements was sampled at a frequency of 4 Hz while the robot moved manually. The translational velocity of the robot was fixed at 150 mm/s and its rotational velocity was 25 deg/s. In addition, the maximum admissible range of the sonar sensor was limited to 4 m because this was sufficient to represent general indoor environments. As localization during mapping was not an issue of concern in this study, it was assumed that pose estimations were available, which rely on the extended Kalman filter-based simultaneous location and mapping (SLAM) (see S. Ahn, J. Choi, N. L. Doh, and W. K. Chung, "A Practical Approach for EKF-SLAM in an Indoor Environment: Fusing Ultrasonic Sensors and Stereo Camera", Autonomous Robots, Vol. 24 (3), 2008, pp. 315-335).

Due to space limitations, only two results for the MA40B8 and the S600, respectively, are illustrated in this specification, while the other results are simply summarized in tables or graphs.

The CEMAL approach vs. conventional grid mapping approaches will now be described next.

The performance of CEMAL is compared with a number of representative grid mapping approaches: the posterior approach (PT), the Dempster-Shafer approach (DS), the fuzzy approach (FZ), and the ML approach.

As mentioned above, PT, DS, and FZ require regulation of the update parameters. For PT, $p(c_{xy}=O|z_i)$ should be regulated, and is generally defined as $$p(c_{xy} = O \mid z_i) = \begin{cases} 0.5 + \dfrac{A_{PT}\Gamma(\theta)}{2} & \text{for } c_{xy} \in A(i) \\ 0.5 - \dfrac{F_{PT}\Gamma(\theta)\Delta(r)}{2} & \text{for } c_{xy} \in F(i) \end{cases} \quad (25)$$

where $c_{xy}$ denotes a cell, O is the occupied state, $z_i$ is the measurements of sonar reading i, $\Gamma(\theta)$ is a weighting function of $\theta$, $\Delta(r)$ is a weighting function of r, and $A_{PT}$ and $F_{PT}$ are the maximum values for their respective weight functions and will be regulated. The weighting functions are defined as the following Equation:

$$\Gamma(\theta) = 1 - \left(\dfrac{\theta}{(\theta_W/2)}\right)^2 \quad (26)$$

$$\Delta(r) = 1 - \dfrac{1 + \tanh(2(r - r_v))}{2} \quad (27)$$

where $\theta_W$ is the beamwidth of the sonar sensor, and $r_u$ is the visibility radius for a smooth transition. As the maximum range of a measurement is 4 m, $r_u$ is set to half of this value. For DS, $m(c_{xy}=O)$ and $m(c_{xy}=E)$ should be controlled, and they are generally defined as the following Equation:

$$m(c_{xy} = O) = \begin{cases} A_{DS}\Gamma(\theta) & \text{for } c_{xy} \in A(i) \\ 0 & \text{for } c_{xy} \in F(i) \end{cases} \quad (28)$$

$$m(c_{xy} = E) = \begin{cases} 0 & \text{for } c_{xy} \in A(i) \\ F_{DS}\Gamma(\theta)\Delta(r) & \text{for } c_{xy} \in F(i) \end{cases} \quad (29)$$

In Equations (28) and (29), $A_{DS}$ and $F_{DS}$ are controllable, as they are for PT. For FZ, $\mu_O(c_{xy})$ and $\mu_E(c_{xy})$ should be adjusted, and they are normally defined as the following Equation:

$$\mu_O(c_{xy}) = \begin{cases} A_{FZ}\Gamma(\theta) & \text{for } c_{xy} \in A(i) \\ 0 & \text{for } c_{xy} \in F(i) \end{cases} \quad (30)$$

$$\mu_E(c_{xy}) = \begin{cases} 0 & \text{for } c_{xy} \in A(i) \\ F_{FZ}\Gamma(\theta)\Delta(r) & \text{for } c_{xy} \in F(i) \end{cases} \quad (31)$$

where $A_{FZ}$ and $F_{FZ}$ are adjustable. There is a physical interpretation of these tunable parameters in the paper "M. Ribo and A. Pinz, "A comparison of three uncertainty calculi for building sonar-based occupancy grids," Robotics and Autonomous Systems, Vol. 35 (3-4), 2001, pp 201-209." Among various parameter candidates, the value that maximizes the correct representation ratio (CRR), which will be described in Section 6.2.2, is used to build a grid map.

For DS in particular, a state that has the maximum of three values (occupied, empty, and unknown) is shown. The Dombi operator (see G. Oriolo, G. Ulivi and M. Vendittelli, "Real-time map building and navigation for autonomous robots in unknown environments", IEEE Transactions on Systems, Man and Cybernetics, Part B, Vol. 28 (3), 1998, pp 316-333) and the bounded product operator are used with FZ. The EM algorithm is used with the ML approach to reduce the computational burden.

Qualitative Comparison

Data is combined from the LRF with a blueprint of each environment to create accurate reference maps (see FIGS. 14 to 17A) because the LRF and the blueprint complement each other. The blueprint compensates for obstacles that the LRF sometimes misses, and the LRF provides detailed information (e.g., furniture and electronic appliances) that the blueprint does not contain.

Figure 15A:
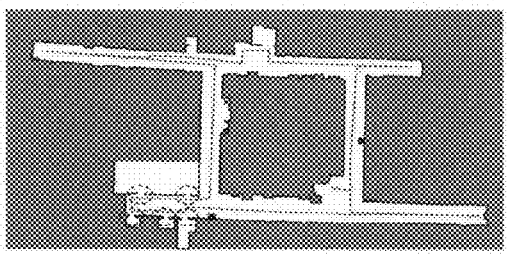
FIGS. 15A to 15F show experimental results in environment C#1 (62 m×30 m) with S600 sensors.
Figure 15B:
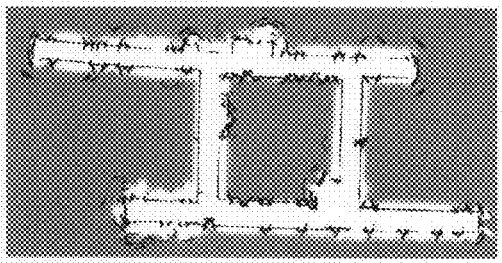
Figure 15C:
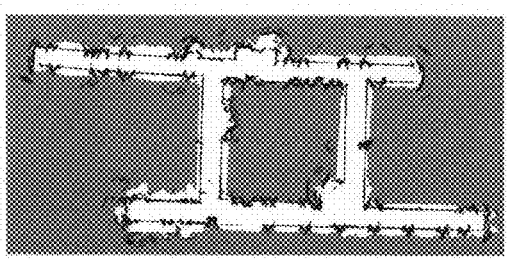
Figure 15D:
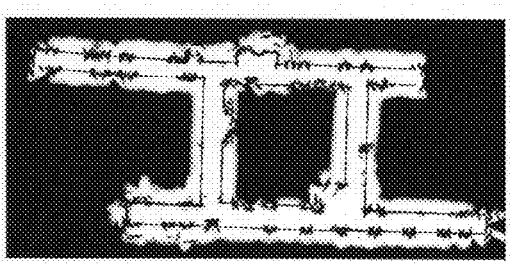
Figure 15E:
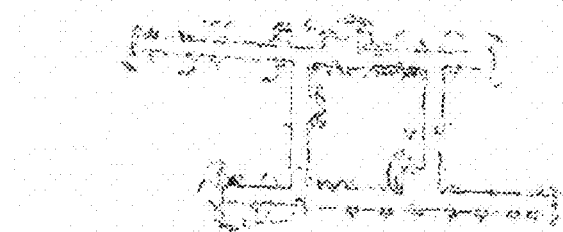
Figure 15F:
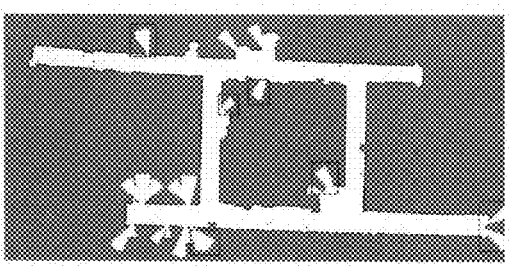
Figure 16C:
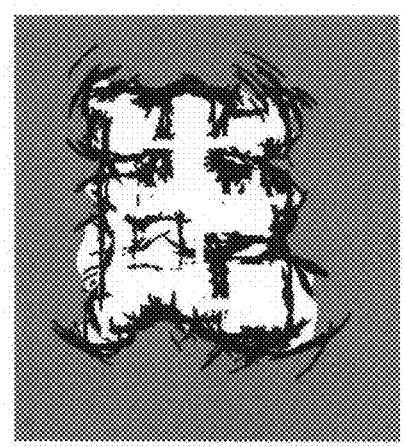
FIGS. 16A to 16F show experimental results in environment H#1 (18 m×16 m) with MA40B8 sensors.
Figure 16F:
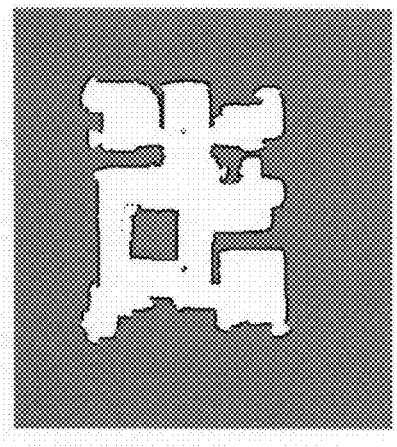
Figure 16B:
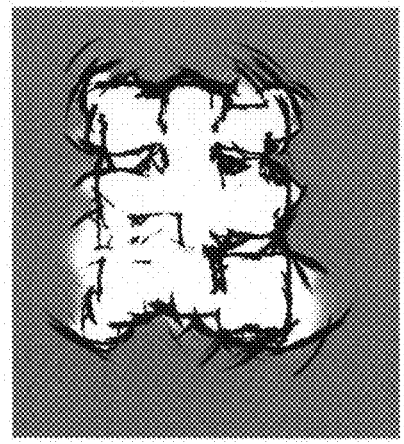
Figure 16E:
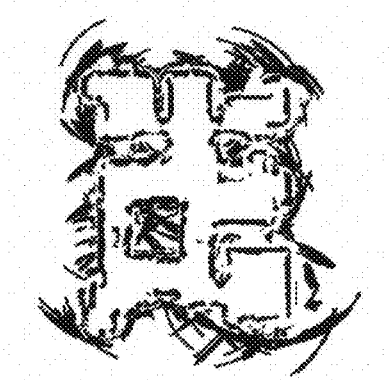
Figure 16A:
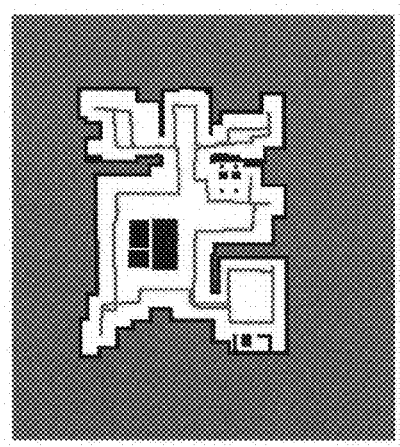
Figure 16D:
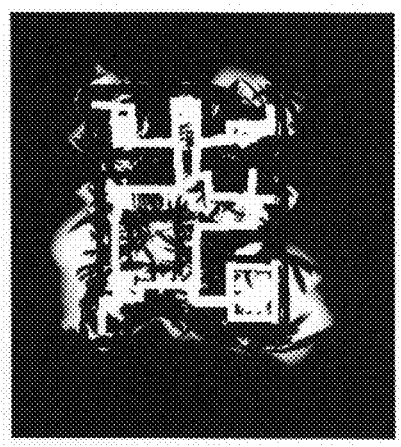
Figure 17C:
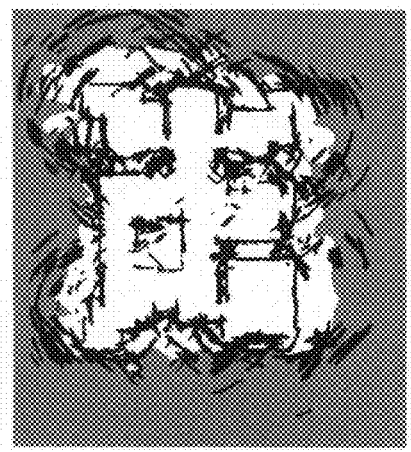
FIGS. 17A to 17F show experimental results in environment H#1 (18 m×16 m) with S600 sensors.
Figure 17F:
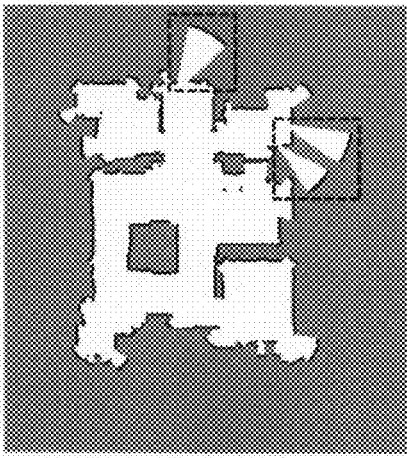
Figure 17B:
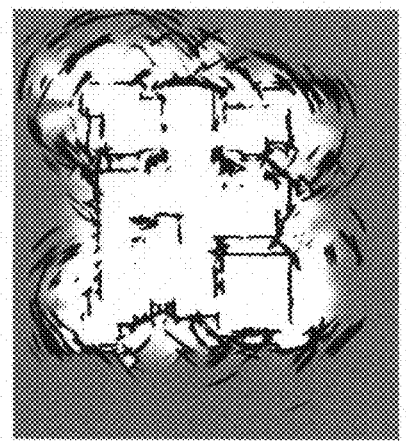
Figure 17E:
Figure 17A:
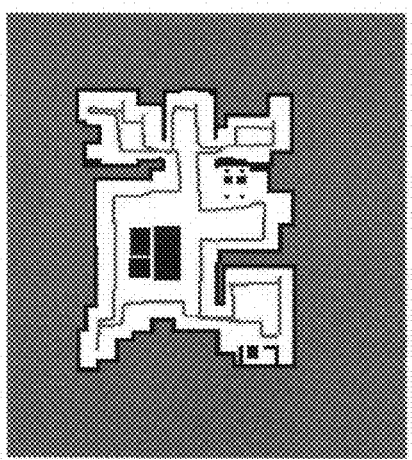
Figure 17D:
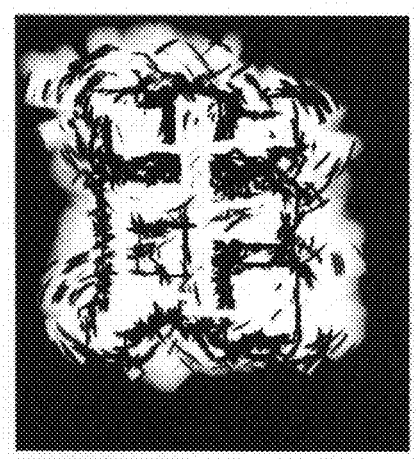

The results of the binary or trinary estimation approaches (PT, DS, and FZ) are shown in FIGS. 14, and 17B to 17D). Although the overall shape of each environment is captured successfully, it is obvious that the maps still contain errors where areas outside the boundary of the environment are marked as empty. Moreover, in FIGS. 14 and 15B to 15D), it can be seen that the five narrow openings circled in FIGS. 14 and 15A are not successfully represented. The failure is the result of improper handling of the angular uncertainty and incorrect measurements. In particular, FIGS. 14B to 14D show that parts of the inner area of the environment are repeatedly blocked because the MA40B8 has a wider beamwidth than that of the S600. In FIG. 16D, the blocking is pronounced because the FZ approach is more conservative in the occupied state. Revising the parameters of each approach to emphasize occupied regions causes previously undetected obstacles to become visible but also results in the appearance of ghost obstacles. Revising the parameters in the opposite direction makes ghost obstacles disappear while also causing some true obstacles to vanish. Thus, these approaches have trade-offs that make it difficult to represent the environment.

On the other hand, the results of the ML approach shown in FIGS. 14A to 15E successfully represent the overall shape of the environment as well as the inner area without any parameter adjustment, even though erroneous parts in the outside area remain. Specifically, in terms of representing the narrow openings, FIGS. 14A to 15E are not satisfactory because incorrect measurements obstruct a clear representation.

In contrast, FIGS. 14A to 17F, which are the results of the CEMAL approach, are excellent compared to the other results in terms of map quality, in that the occupied regions are placed more accurately and the empty regions are shown more clearly. The narrow openings in particular are clearly represented. There are still a few erroneous sections indicated by dashed areas in FIGS. 14A to 17F, because the CEsp method does not completely remove all incorrect measurements. Nevertheless, it is clear that the CEMAL approach has the best ability to represent the environment without adjusting parameters even with erroneous sonar measurements.

Quantitative Comparison

Two criteria are defined to evaluate and compare the performance of the mapping approaches quantitatively. The first is the correct representation ratio (CRR), a type of reliability measure that indicates the map accuracy. The CRR is given by the following Equation:

$$\frac{CRR}{100} = \frac{\text{\# of correct empty cells in the map being evaluated}}{\text{\# of all empty cells in the map being evaluated}} \quad (36)$$

where a correct empty cell is a cell that is designated empty in both the reference map and the map being evaluated.

The second criterion is the complete representation ratio (MRR), which shows how much the map succeeds in representing the environment. The MRR is a type of completeness measure and is given by the following Equation:

$$\frac{MRR}{100} = \frac{\text{\# of correct empty cells in the map being evaluated}}{\text{\# of all empty cells in the reference map}} \quad (37)$$

Figure 18:
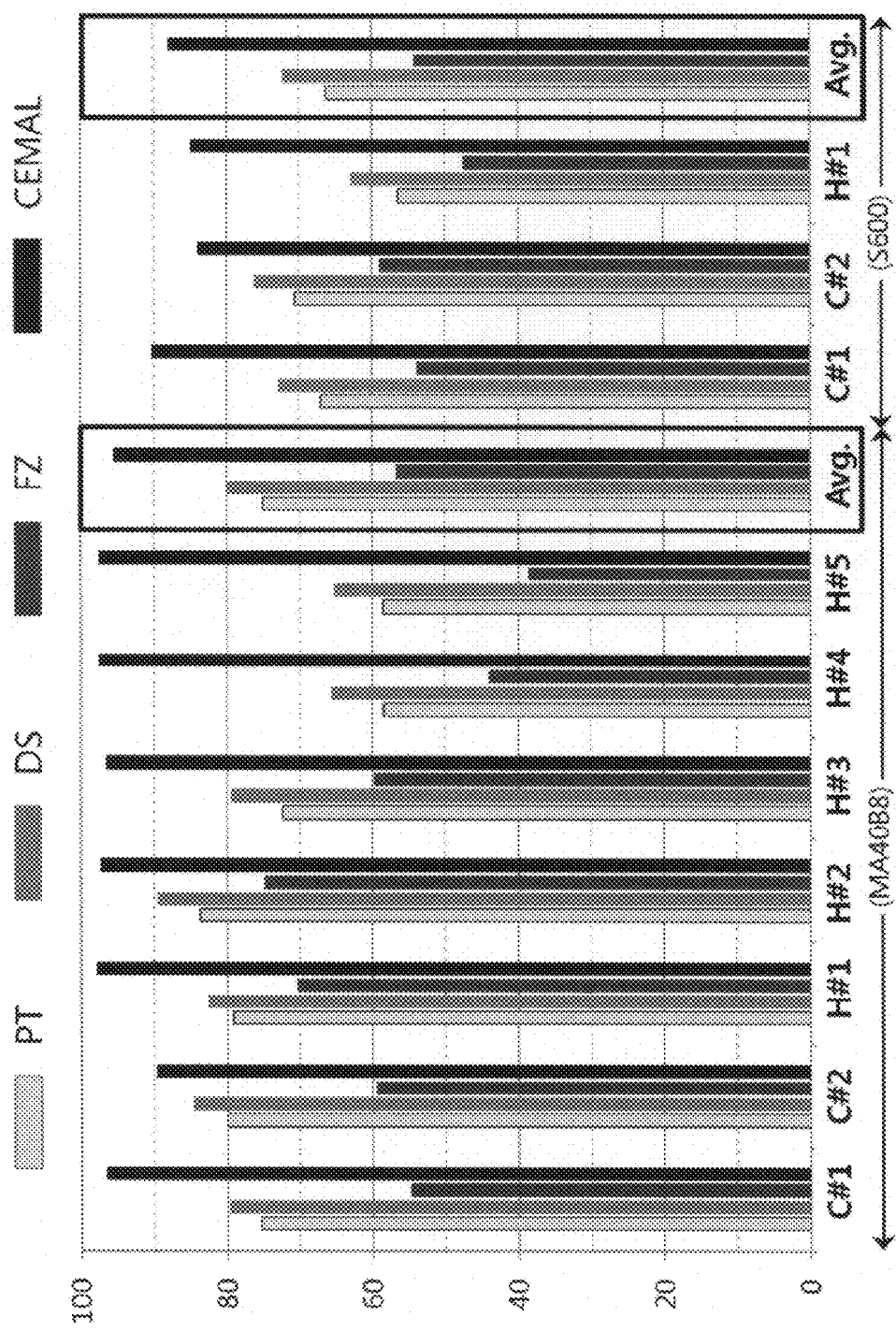
FIG. 18 shows correct representation ratios (CRR) for the different approaches, in which one experiment was conducted for each environment.
Figure 19:
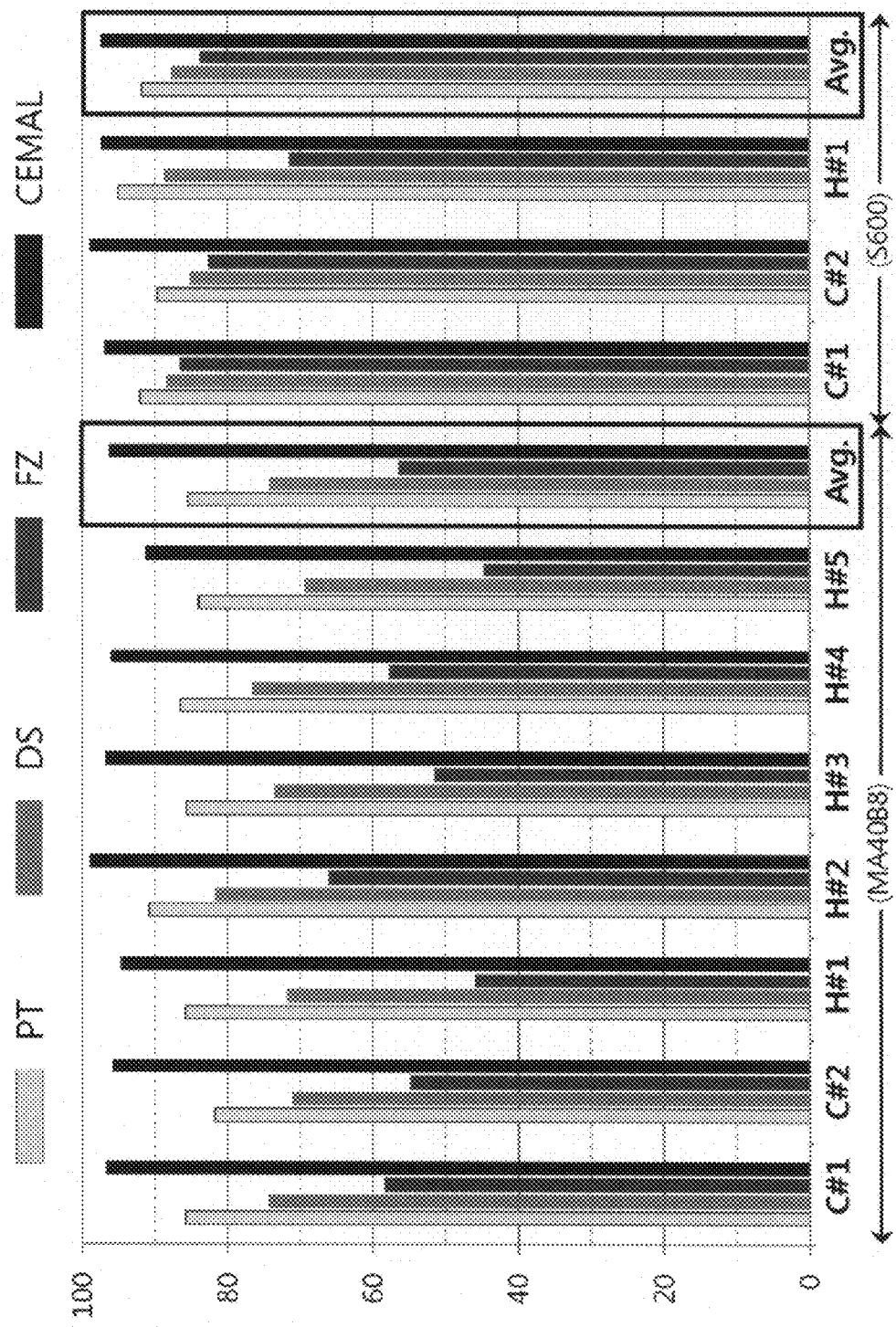
FIG. 19 shows complete representation ratios (MRR) for the different approaches, in which one experiment was conducted for each environment.

FIGS. 18 and 19 show that CEMAL has the best performance in terms of CRR and MRR. The CRR results indicate that a CEMAL map is 92% accurate, and the MRR indicates that it represents about 96% of the entire environment. Thus, the CEMAL map is a faithful representation.

Computational Load

TABLE 2

| | | Total Computational Time (sec) | | | | |
|---|---|---|---|---|---|---|
| | Env. | PT | DS | FZ | ML(EM) | CEMAL |
| MA40B8 | C#1 | 37 | 38 | 75 | 47,500 | 105 |
| | C#2 | 9 | 9 | 18 | 47,500 | 19 |
| | H#1 | 10 | 10 | 22 | 26,071 | 38 |
| | H#2 | 6 | 6 | 13 | 7,346 | 12 |
| | H#3 | 4 | 4 | 8 | 9,807 | 19 |
| | H#4 | 7 | 8 | 17 | 14,293 | 34 |
| | H#5 | 5 | 5 | 12 | 11,506 | 22 |
| | Avg. | 11 | 12 | 24 | 18,303 | 36 |
| S600 | C#1 | 41 | 42 | 72 | 4,297 | 81 |
| | C#2 | 11 | 11 | 20 | 1,258 | 21 |

TABLE 2-continued

| | | Total Computational Time (sec) | | | | |
|---|---|---|---|---|---|---|
| | Env. | PT | DS | FZ | ML(EM) | CEMAL |
| | H#1 | 15 | 15 | 28 | 7,239 | 43 |
| | Avg. | 22 | 23 | 40 | 4,265 | 48 |

*OS: Windows XP, CPU: 2.6-GHz Pentium 4, Language: C++, Application: Single thread application Table 2 shows the total computation time required to create the map using each approach. The ML approach requires a very long time despite using the EM algorithm, and this makes it impractical for actual use. On the other hand, while the CEMAL approach is based on the ML approach, its execution time is comparable to the other estimation approaches. The CEMAL time is somewhat longer because CEMAL is a two-layered approach incorporating a filtering layer (CEsp method) and a fusion layer (MAL approach), while PT, DS, and FZ, have only a fusion layer. Even though it is longer, the CEMAL execution time is not prohibitive for practical use. Therefore, the CEMAL approach is a good alternative considering the resulting map quality and the computation time.

TABLE 3

| | | Mean Computation Time for Processing One Sonar Measurement (msec). | | | |
|---|---|---|---|---|---|
| | Env. | PT | DS | FZ | CEMAL |
| MA40B8 | C#1 | 0.5 | 0.5 | 1.0 | 1.4 |
| | C#2 | 0.4 | 0.4 | 0.9 | 0.9 |
| | H#1 | 0.3 | 0.3 | 0.6 | 1.1 |
| | H#2 | 0.3 | 0.3 | 0.8 | 0.7 |
| | H#3 | 0.2 | 0.2 | 0.5 | 1.1 |
| | H#4 | 0.2 | 0.2 | 0.5 | 1.0 |
| | H#5 | 0.2 | 0.2 | 0.5 | 0.9 |
| | Avg. | 0.3 | 0.4 | 0.7 | 1.1 |
| S600 | C#1 | 0.4 | 0.4 | 0.7 | 0.8 |
| | C#2 | 0.4 | 0.4 | 0.7 | 0.7 |
| | H#1 | 0.3 | 0.3 | 0.5 | 0.8 |
| | Avg. | 0.4 | 0.4 | 0.7 | 0.8 |

Table. 3 shows the mean computation time for a single measurement to confirm the feasibility of the incremental CEMAL approach. The mean time of MA40B8 measurements is longer than that of S600 measurements because of the larger beamwidth. The CEMAL approach requires an average of 1 ms to process a measurement, and is thus quite practical for real-time operation.

CEMAL approach vs. methods for coping with sonar sensor characteristics will now be described next.

As described above, previous work regarding the sonar sensor characteristics can be grouped into filtering incorrect measurements and handling the angular uncertainty. Therefore, the CEMAL approach was examined using these two considerations.

Filtering Incorrect Measurements

In the foregoing description, previous work on rejection of incorrect sonar measurements was divided into three classes. For comparison with the CEsp method, a representative method was selected from each of the four classes: RCD, RANSAC/GF, NVD, and spAC.

It is necessary to determine the actual state of all sonar readings to verify the performance of these methods. Based on the reference map presented above, the state is likely to be incorrect when $|z_t - d(N_t)| > 150$ mm. The correct decision ratio (CDR) was created based on the reference state of all sonar readings to indicate the proportion of measurements correctly determined through a filtering process. CDR is defined as the following Equation:

$$CDR = \frac{\text{\# of correctly decided measurements}}{\text{\# of all measurements}} \times 100. \qquad (38)$$

The numerator in Equation (34) is the total number of measurements accurately determined to be correct or incorrect.

Figure 20:
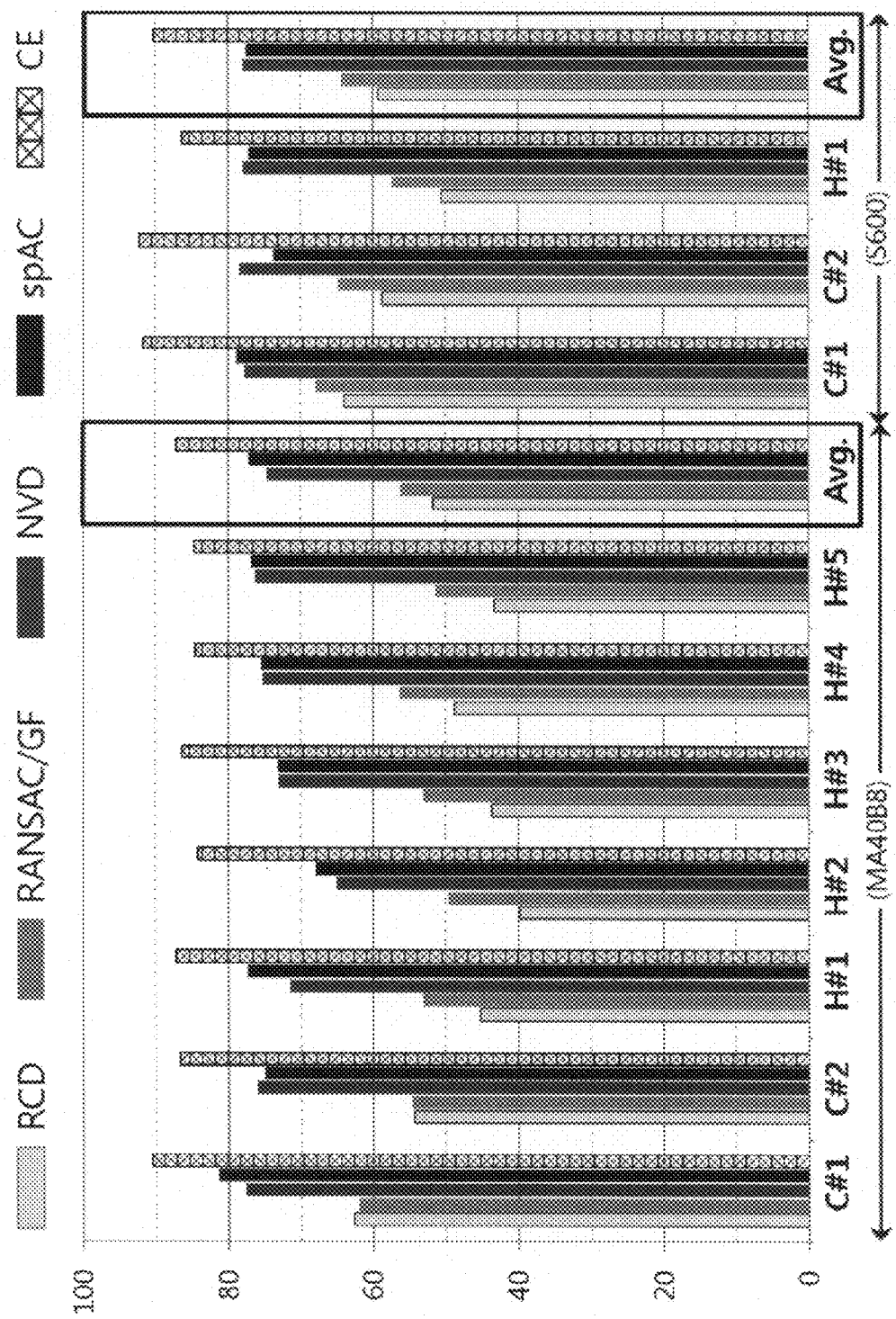
FIG. 20 shows correct decision ratio (CDR) for the different approaches.

As shown in FIG. 20, the CEsp method has the best performance for correctly determining the state of measurements, with a CDR of about 88%. This confirms that the CEsp method is useful in practical applications for determining the true state of sonar readings. The spAC method also has relatively good performance compared to the others. As both the CEsp and spAC methods are based on conflict cells, the results show the power of the conflict cell approach in filtering sonar measurements.

Handling Angular Uncertainty

In general, for dealing with the angular uncertainty, an environment is represented with the arc map (see D. Baskent and B. Barshan, "Surface profile determination from multiple sonar data using morphological processing", International Journal of Robotics Research, Vol. 18 (8), 1999, pp 788-808). The ATM and DM methods show the best performance (see B. Barshan, "Directional Processing of Ultrasonic Arc Maps and its Comparison with Existing Techniques," International Journal of Robotics Research, Vol. 26 (8), 2007, pp 797-820). The performance of the ATM, DM, and AC methods in representing the narrow openings indicated by dotted circles in FIGS. 21A to 22A, which are shown in the lower left-hand portions of FIGS. 14A to 15A, respectively, are compared with each other. The representation of narrow openings is investigated because the management of angular uncertainty is difficult to measure quantitatively. For a fair comparison, only the readings remaining after applying the CEsp method were used.

Figures 21A, 21B, 21C, 21D, 21E:
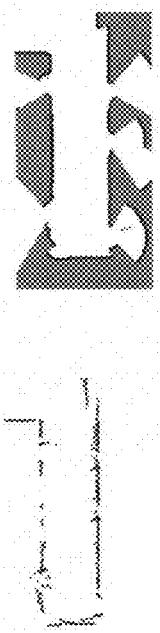
FIGS. 21A to 21E show the lower left-hand portion of the experimental results in environment C#1 (12 m×6 m) with MA40B8 sensors.
Figures 22A, 22B, 22C, 22D, 22E:
FIGS. 22A to 22E show the lower left-hand portion of experimental results in environment C#1 (12 m×6 m) with S600 sensors.

For the S600, FIGS. 22B to 22E show that all methods successfully map the narrow openings. For the MA40B8, which has bigger angular uncertainty than the S600 due to wider beamwidth, however, the results of the other methods are not satisfactory because some narrow openings are blocked as shown in FIGS. 22B to 22D. Even with the MA40B8, the CEMAL approach clearly expresses the narrow openings as shown in FIG. 21E. These results illustrate that the CEMAL approach can handle the angular uncertainty appropriately, and thus express narrow openings, regardless of the type of sonar sensor.

The use of only two sonar sensors will now be described next.

Figure 23A:
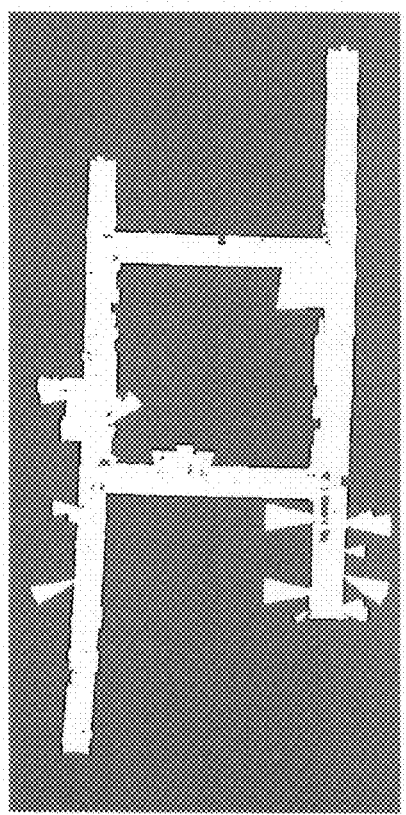
FIGS. 23A and 23B show CEMAL maps in environment C#1 (62 m×30 m)
Figure 23B:
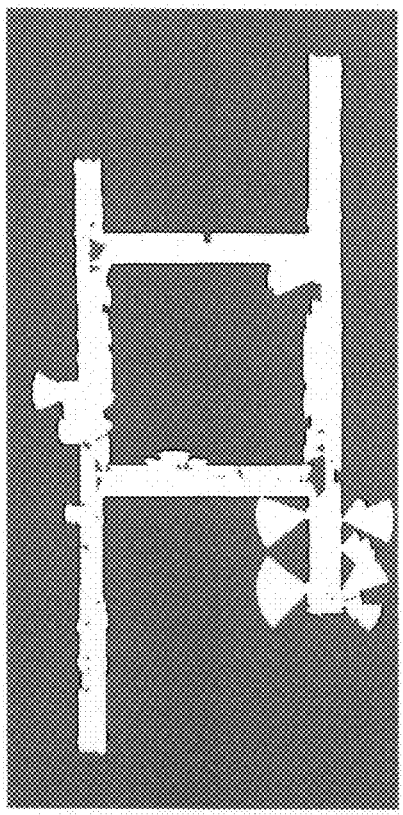

For reasons of cost, a low number of sonar sensors is desirable for a commercial service such as a robotic vacuum cleaner. To explore this possibility, only the two sonar sensors shown in FIG. 13 are used for building a grid map with the CEMAL approach. As shown in FIGS. 23A and 23B, the CEMAL approach faithfully represents the overall shape of the environment as well as accurately showing occupied regions. It does, however, omit some empty areas in the inner region of the environment because incorrect measurements are rejected and there are insufficient sonar measurements to cover the whole area. In other environments, results of the CEMAL approach are similar to FIGS. 23A and 23B in terms of overall representation and partial omission. In future research, a way to reuse filtered incorrect measurements when there are insufficient sonar measurements is proposed. As a filtered reading is not entirely wrong and part of the reading contains useful information, reprocessing can compensate for a lack of measurements.

Figure 1B:
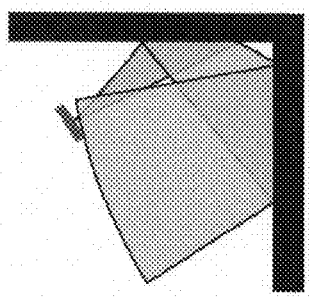
Figure 1C:
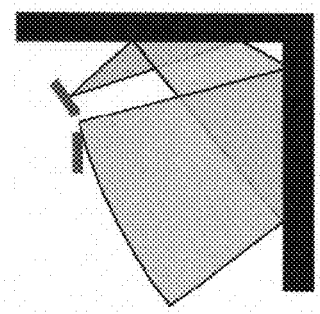

It should be noted that the configuration of the sonar sensors may be critical to sonar measurements when using only two sensors. In our experiments, the robot followed the walls, and if its two sonar sensors are located on the front and rear, then almost all sonar measurements would be incorrect due to undesirable reflections (see FIGS. 1A to 1C). Because the CEsp method is designed to select correct measurements, it does not produce usable results when almost all measurements are incorrect. As shown in FIG. 13, sonar sensors on the right and left sides of the robot were used to reduce the proportion of incorrect measurements. Therefore, when only two sonar sensors are used to construct a grid map, their configuration should be carefully considered in order to obtain useful measurements.

Conclusion will be described below.

The present invention was started by asking what was the maximal level of grid map that could be built by sonar sensors. It began with the ML approach because of its suitability for dealing with the angular uncertainty of the sonar sensor. The ML approach, however, has two critical problems: the heavy computational load and erroneous parts. The first of these problems prevents general practical use of the ML approach, and the second severely degrades the quality of the ML grid map.

To overcome the problems of the ML approach, it is essential to eliminate conflict cells by filtering out incorrect measurements that cause them. This led us to the CEsp method using the sound pressure of the sonar sensor. After removing conflict cells by the CEsp method, the high-dimensional optimization problem could be converted to the MAL approach. Integrating the MAL approach with the CEsp method results in the CEMAL approach.

The CEMAL approach has computational complexity of $O(n)$, which is very low compared to that of the ML approach $O(2^k n)$ and comparable to those of the binary and trinary estimation approaches (both $O(n)$). In addition, because the CEsp method rejects most of the incorrect measurements, the quality of the CEMAL grid map is quite high, even using cheap sonar sensors. In situations where the number of sonar readings may not be sufficient, the CEMAL grid map faithfully represents the environment. Furthermore, when acquiring an accurate map, the CEMAL approach does not require parameter adjustment if a fixed type of sonar sensor is used, even though parameters of binary or trinary estimation approaches require tuning whenever a different environment is used for building a grid map, even when the type of the sensor is fixed. Several indoor experiments confirmed that the CEMAL approach is a good compromise between the quality of the map it produces and the computational complexity it entails. In addition, the CEsp method is better than existing methods at determining the true state of sonar measurements. It can be useful for other sonar sensor applications, such as localization and obstacle avoidance, because it is simple and effective.

There are two aspects of the present invention that should be noted. First, it was assumed that pose estimations were available. If the level of pose estimation error is excessive, the quality of the CEMAL grid map cannot be guaranteed. In our experiments, the maximum error between the real final pose and the estimated final pose was approximately 10 cm in both the x and y directions. Second, the case of moving obstacles was not considered. All experiments were conducted in a static environment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of constructing an environmental map by a robot using sonar sensors, the method comprising:
    checking by the robot whether conflict cells have occurred using input sonar sensor data from the sonar sensors;
    if conflict cells have occurred, the robot selecting incorrect data and eliminating the conflict cells using sound pressure comparison until the conflict cells do not occur any longer; and
    once the elimination has completed, the robot preparing a grid map using a Maximum Approximated Likelihood (MAL) approach.

2. The method as set forth in claim 1, wherein inconsistency in data occurs when multiple pieces of sensor data overlap each other, the conflict cells are cells that contain inconsistency over an entire arc region, and candidates for the incorrect sonar sensor data are obtained when the conflict cells occur.

3. The method as set forth in claim 1, wherein the sound pressure comparison is adapted to extract only correct data from among candidates for the incorrect data using relative intensity of sound waves that are detected by the sonar sensors when sound waves emitted from the sonar sensors collide with an obstacle and then return and that is defined by the following equation:

$$SP_R(r, \theta) = c_2 SP_T(2r, 0) 10^{\frac{D_T(\theta)}{20}} 10^{\frac{D_R(\theta)}{20}}$$
$$= \frac{c_3}{r} 10^{\frac{D_T(\theta)+D_R(\theta)}{20}}$$

where $SP_R(r,\theta)$ is the final detected sound pressure, r is the distance from the sensor to the obstacle, $\theta$ is the angle from the heading of the sensor, $D_T(\theta)$ is the transmitting directivity, $D_R(\theta)$ is the receiving directivity, and $c_2$ and $c_3$ are unknown constants.

4. The method as set forth in claim 3, wherein the relative intensity of the sound waves is obtained considering directional characteristics of the specific sonar sensors.

5. The method as set forth in claim 3, wherein the sound pressure comparison can determine presence of an obstacle by comparing sound pressure of sensor data containing information about presence of an obstacle with sound pressure of sensor data containing information about non-presence of an obstacle.

6. The method as set forth in claim 2, wherein the elimination of the conflict cells is performed by, among the candidates for the incorrect data, determining presence of the obstacle using the sound pressure comparison, and selecting and eliminating the incorrect data using the obstacle the presence of which has been determined, thereby eliminating inconsistency in the sensor data.

7. The method as set forth in claim 1, wherein likelihood in the maximum approximated likelihood approach is defined by the following equation:

$$p(z_i \mid M) = \eta \exp\left\{-\frac{1}{2}\left(\frac{z_i - d(N_i)}{\sigma}\right)^2\right\}$$

where $z_i$ is measurement of the sensors, M is the grid map, $\eta$ is a normalization term, $\sigma$ is uncertainty of the sonar sensor data, and $d(N_i)$ is distance to a nearest obstacle $N_i$ and is defined by the following equation:

$$d(N_i) = \begin{bmatrix} \text{distance to } N_i & \text{for } N_i \neq \theta \\ z_{max} & \text{for } N_i = \theta \end{bmatrix}.$$

8. The method as set forth in claim 7, wherein a maximum likelihood solution of the maximum approximated likelihood is expressed by the following equation:

$$\mathrm{argmax}_M \, p(Z \mid M) = \mathrm{argmin}_M \sum_i (z_i - d(N_i))^2$$

where $Z=\{z_1, \ldots, z_n\}$, M is the grid map, $z_i$ is measurement of the sensors, and $d(N_i)$ is distance to a nearest obstacle $N_i$.

9. The method as set forth in claim 8, wherein the maximum approximated likelihood is approximated considering the uncertainty of the sonar sensor data in the equation of claim 8.

10. The method as set forth in claim 9, wherein a global solution of the equation of claim 8 is obtained:
    with, in the case of consistent cells, the consistent cells being set to an occupied state if the cells have information about occupation, and being set to an empty state if the cells have information about emptiness, and
    with, in the case of uncertain cells, the cells being always set to an empty state.

* * * * *